US006945870B2

(12) United States Patent
Gatto et al.

(10) Patent No.: US 6,945,870 B2
(45) Date of Patent: Sep. 20, 2005

(54) MODULAR ENTERTAINMENT AND GAMING SYSTEM CONFIGURED FOR PROCESSING RAW BIOMETRIC DATA AND MULTIMEDIA RESPONSE BY A REMOTE SERVER

(75) Inventors: Jean-Marie Gatto, London (GB); Thierry Brunet De Courssou, Palo Alto, CA (US); Pierre-Jean Beney, London (GB)

(73) Assignee: Cyberscan Technology, Inc., Palo Alto, CA (US)

( * ) Notice: Subject to any disclaimer, the term of this patent is extended or adjusted under 35 U.S.C. 154(b) by 0 days.

(21) Appl. No.: 10/120,668

(22) Filed: Apr. 10, 2002

(65) Prior Publication Data

US 2003/0100371 A1 May 29, 2003

Related U.S. Application Data

(60) Provisional application No. 60/332,593, filed on Nov. 23, 2001.

(51) Int. Cl.7 .............................. A63F 9/24; G06K 9/00

(52) U.S. Cl. .......................... 463/29; 463/25; 340/5.52; 340/5.82; 382/115; 382/118; 902/23; 902/3; 713/186

(58) Field of Search ............................... 463/40–42, 29, 463/25, 16–22, 12–13, 39; 273/138.1, 138.2, 139, 143 R; 382/115, 116, 118; 340/825, 5.1, 5.2, 5.21, 5.51, 5.52, 5.53, 5.8–5.84, 323 R; 902/1–6, 23; 235/375, 380–382.5; 713/182, 186; 709/201, 203

(56) References Cited

U.S. PATENT DOCUMENTS

| | | | | |
|---|---|---|---|---|
| 5,179,517 A | | 1/1993 | Sarbin et al. | |
| 5,674,128 A | | 10/1997 | Holch et al. | |
| 5,762,552 A | * | 6/1998 | Vuong et al. | 463/29 |
| 5,800,269 A | | 9/1998 | Holch et al. | |
| 5,970,143 A | * | 10/1999 | Schneier et al. | 463/29 |
| 6,089,982 A | | 7/2000 | Holch et al. | |
| 6,142,876 A | * | 11/2000 | Cumbers | 463/29 |
| 6,280,328 B1 | | 8/2001 | Holch et al. | |
| 6,749,510 B2 | | 6/2004 | Giobbi | |

FOREIGN PATENT DOCUMENTS

WO WO 01/41892 A2 6/2001

* cited by examiner

*Primary Examiner*—Mark Sager
(74) *Attorney, Agent, or Firm*—Young Law Firm, P.C.

(57) ABSTRACT

A secure and modular architecture for monitoring and controlling clusters of pay entertainment and gaming devices. The architecture allows flexible and secure use of state-of-the-art multimedia and Internet technologies to attract the younger player generation used to flashy and networked games. Cash or cash-less entertainment and gaming devices are supported.

45 Claims, 18 Drawing Sheets

200

300

700

MODULAR ENTERTAINMENT AND GAMING SYSTEM CONFIGURED FOR PROCESSING RAW BIOMETRIC DATA AND MULTIMEDIA RESPONSE BY A REMOTE SERVER

This application claims the benefit of 60/332,593 filed Nov. 23, 2001.

CROSS-REFERENCE TO RELATED APPLICATIONS

This application is related to co-pending and commonly assigned application Ser. No. 10/120,816 filed on Apr. 10, 2002, co-pending and commonly assigned application Ser. No. 10/120,647 filed on Apr. 10, 2002, and co-pending and commonly assigned application Ser. No. 10/120,635 filed on Apr. 10, 2002, the disclosures of each being incorporated herewith by reference.

BACKGROUND OF THE INVENTION

1. Field of the Invention

This invention relates generally to the field of pay computer-controlled games and entertainment devices, including both games of skills and games of chance. More particularly, the present invention relates the field of methods, systems and devices for the automated monitoring and control of a large number of clusters of such pay gaming and entertainment devices.

2. Description of the Related Art

Conventional pay entertainment and gaming systems, either of the cash or the cashless type, are seriously limited due to the technical choices that are typically made to comply with regulatory requirements. Indeed, regulators are mainly concerned with fraud, cheating and stealing, as may occur when legitimate winners are deprived of their just winnings or when illegitimate users receive illegitimate winnings. Because of these security concerns, regulators are reluctant to approve licenses for state-of-the-art "open" multimedia and Internet technologies, opting instead for known but antiquated technology.

However, the security of such antiquated technology (i.e., technology developed prior to the present advanced multimedia and Internet age) is mostly illusory. Such conventional technologies are only perceived as being more stable and secure because their flaws are not widely publicized. Computer technology being extremely complex, there are always latent imperfections and flaws, which may be exploited by the ill intentioned. This is even truer with antiquated technology, as backer-crackers have now access to considerable information on software weaknesses as well as sophisticated attack strategies and tools that they may apply to older software.

Legacy entertainment and gaming systems that are authorized for use in public places are usually aggregates of old technologies bundled together with some PC hardware featuring basic fault tolerance, basic data integrity and add-hoc security means, together with some LAN networking functionality to enable some primitive centralized auditing. Although some advanced security means have been proposed (such as disclosed in, for example WO 01/41892) that promote off-line gaming security using smart cards, this approach in fact exposes the system to latent unidentified security threats that hacker-crackers or employees will likely eventually exploit. Off-line or semi-on-line systems are totally in the hands of very few people. In short, these systems operate essentially with little means for detecting under-the-radar fraud (to push the analogy farther, finer-grained and smarter radar means would be uneconomical for casino and gaming operators to implement).

In contrast, lottery and pari-mutual wager systems have evolved to modem fully on-line very-high-capacity mission-critical systems funneling billions of dollars annually while offering significantly greater security means than the security afforded by banks. Since these organizations have come on-line, lawsuits resulting from complaints, flaws and fraud, including internal fraud by employees, have virtually disappeared. However, although pay entertainment and gaming machines based on secure Internet web browser and cashless payment technology are ideal centralized candidate solutions to equip casinos and like sites, these may rapidly kill the traditional gaming support industry.

The entertainment and gaming systems lag behind state-of-the-art multimedia PC, gaming console, wireless and interactive TV technologies; consequently these systems are ill prepared to attract the younger player generation accustomed to flashy and networked games.

SUMMARY OF THE INVENTION

It is therefore an object of this invention to provide an architecture that overcomes the technical lag, security limitations and lack of stability of the prior art. It is a further object of this invention to provide an architecture that overcomes rapid obsolescence of technology. It is yet another object of this invention to provide a flexible architecture that may more easily accommodate the variety of specific regulatory requirements encountered around the world. It is a still further object of this invention to provide specific function peripheral devices with means of secure identification and secure network communication.

According to an embodiment thereof, the present invention is a gaming system including at least one gaming machine including: means for receiving and displaying video images and means for providing user interaction network services; at least one central server including, for each gaming machine, means for consuming the user interaction network services; processing means for applying game rules and computer graphics means for creating video images in response to directives from at least one of the processing means for applying game rules and the user interaction network services; video casting means for transmitting the video images and a communication network linking the gaming machine and the central server enabling the network services to be supplied and consumed. Each gaming machine displays video images produced by the central server in response to user interaction.

The communication network may use wireless technology and the video casting means may use wireless technology and the gaming machine may be portable and mobile. The user interaction may include means for processing voice commands. The video casting means may use analog or digital TV wireless or cable broadcast technology. The means for receiving and displaying video images may include a standard TV fitted with a video signal tuner, a plasma screen fitted with a video receiver, a High Definition Television (HDTV) fitted with a HDTV video tuner, a TV set top box and TV, a HDTV set top box and a HDTV or a video display driven by a hardware digital decoder, for example. Each computer server in the farm of computer servers may further include means for creating and casting sound signals for each gaming machine, and each gaming machine may further include means for receiving and rendering sound signals.

The present invention is also a gaming system including: at least one gaming machine including: means for receiving and displaying video images; means for providing user interaction network services; at least one central server system including: a farm of computer servers, the farm including one computer server associated with each gaming machine, each computer server including: means for consuming user interaction network services; processing means for applying game rules and computer graphics means for creating video images in response to directives from the processing means for applying game rules and/or the user interaction network services; video casting means for transmitting the video images, and a communication network linking the gaming machine and the central server to enable network services to be supplied and consumed. Each gaming machine displays video images produced by the associated computer server central server in response to user interaction.

According to a still further embodiment, the present invention is a gaming system including: at least one gaming machine including: means for receiving, decoding and displaying video images and means for providing user interaction network services; at least one central server including, for each of the gaming machine: means for consuming user interaction network services; computer means for processing game rules; computer graphics means for creating video images in response to directives from the computer means for processing game rules and/or the user interaction network services; video coding means for compressing the video image; video casting means for transmitting the compressed video images and a communication network linking the gaming machine and the central server to enable network services to be supplied and consumed. Each gaming machine displays video images produced by the central server in response to user interaction.

The communication network may use wireless technology and the video casting means may use wireless technology and the gaming machine may be portable and mobile. The user interaction means may include means for processing voice commands. The video coding means may use digital video encoding technology. The video casting means may use network video streaming. The video casting means may use an IP wired network communication standard. The video casting means may use a wireless network communication standard. The central server may further include means for creating and casting sound signals for each gaming machine and each gaming machine may further include means for receiving and rendering sound signals.

A gaming system according to the present invention may include at least one gaming machine, including: means for digitally capturing user raw biometric data; means for providing user raw biometric data network services; at least one central server including, for each gaming machine: means for consuming user raw biometric data network services; computer means for processing the raw biometric data, means for providing processed biometric data network services and a communication network linking the gaming machine and the central server to enable network services to be supplied and consumed. The gaming machine obtains processed biometric data from the central server in response to capture of user raw biometric data.

According to another embodiment, a gaming system may include at least one gaming machine, including at least one specialized device having: means for digitally capturing user raw biometric data; means for providing user raw biometric data network services; at least one central server including, for each gaming machine: means for consuming user raw biometric data network services; computer means for processing the raw biometric data, means for providing processed biometric data network services, and a communication network linking the at least one gaming machine, the at least one specialized device and the at least one central server to enable network services to be supplied and consumed, wherein the at least one gaming machine obtains processed biometric data from the at least one central server in response to capture of user raw biometric data.

The communication network may use wireless technology and the gaming machine may be portable and mobile. The raw biometric data may include unprocessed fingerprint or palm print data. The raw biometric data may include unprocessed voice data. The raw biometric data may include an unprocessed video image of a user's head or face. The processed biometric data constitutes a certified identity of the user. The processed biometric data may include a software command event resulting from a user voice command. The raw biometric data may include unprocessed video image of a user's head or face and the processed biometric data may include a user avatar.

Another gaming system may include: at least one gaming machine, including: means for digitally capturing user raw biometric data; means for providing user raw biometric data network services; at least one central server system including a farm of computer servers, one computer server being associated with each gaming machine, each of the computer server including: means for consuming user raw biometric data network services; computer means for processing the raw biometric data; means for providing processed biometric data network services and a communication network linking each gaming machine with its associated computer server enabling network services to be supplied and consumed. Each gaming machine obtains processed biometric data from its associated computer server in response to capture of user raw biometric data.

According to still another embodiment thereof, the present invention is also a method of controlling a gaming system including a gaming machine and a central server system, including the steps of: providing network hardware and software to at least one specialized device of the gaming machine to enable the specialized device to offer network services; executing software in the central server system that consumes the network services and monitoring and controlling events associated with the operation of the specialized device by the software in a central server system. The specialized device may include a payment device and/or an identification device, for example.

DETAILED DESCRIPTION OF THE INVENTION

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

Figure 1:
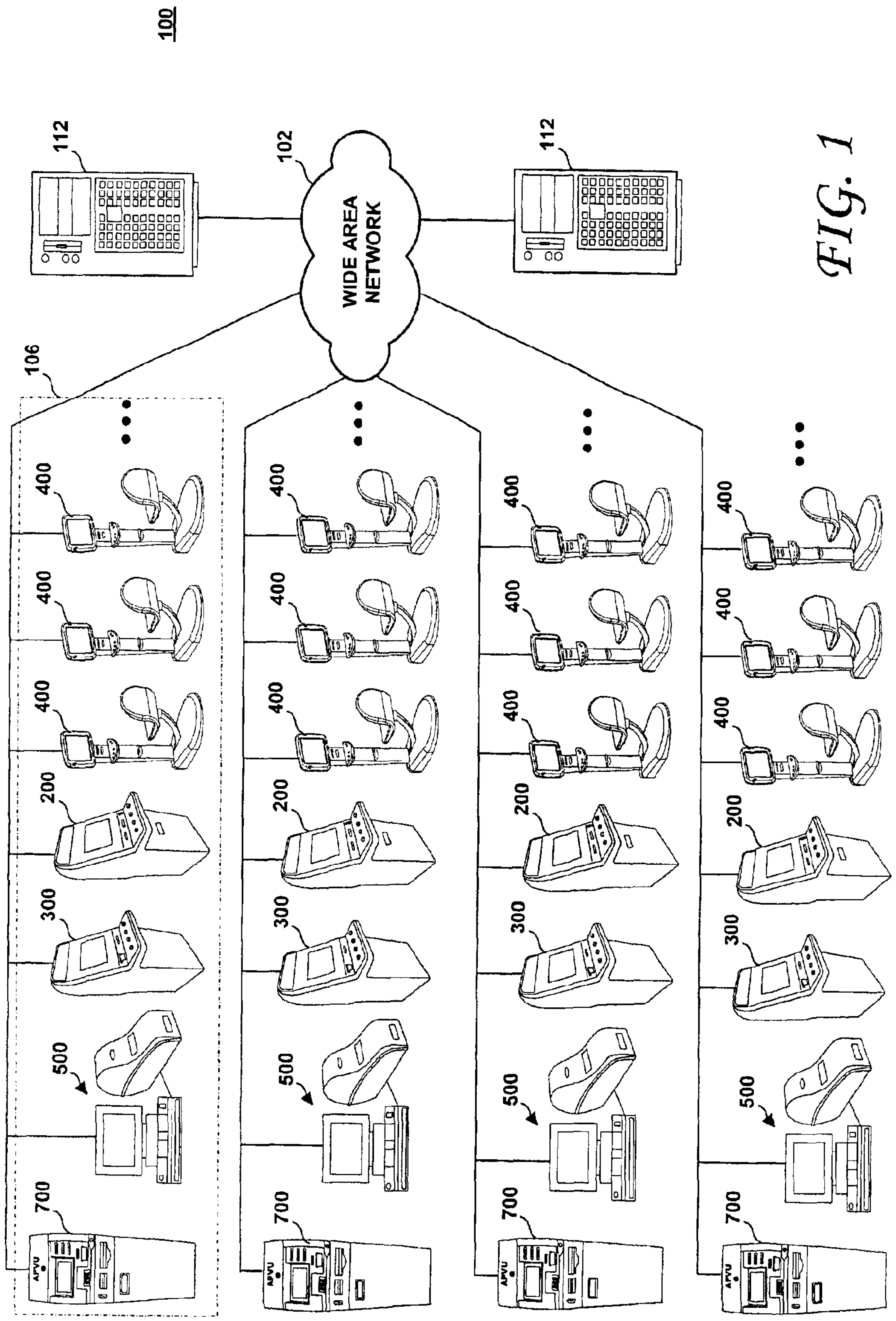
FIG. 1 is a diagram of a gaming system in accordance with an embodiment of the present invention.

FIG. 1 illustrates a gaming system 100 according to an embodiment of the present invention. The system 100 may include a plurality of gaming machines 200, 300; one or a plurality of gaming machines clusters 106 located in the same site or in geographically dispersed locations; a plurality of Payment Verification Units 500 (hereafter, "PVU"), at least one such PVU 500 being associated with each gaming machines cluster 106, and one or more central server(s) 112. Instead of or in addition to the PVU 500, a compact PVU 600 (FIG. 6) and/or an automated PVU or APVU 700 may be associated with individual gaming machines 200, 300 and/or cluster(s) 106. The clustering of gaming machines may be carried out according to geographical location, type of gaming machine, regulatory requirements, type of application and/or any criteria for grouping the gaming machines in a physical or logical cluster 106. The gaming machines 200, 300, PVUs 500, 600 or 700 and central server(s) 112 are networked together within a wide area network 102 (which may include, for example, the Internet).

The gaming system 100 may further include one or a plurality of entertainment machines. Alternatively, the entertainment machines 400 may be substituted for all or some of the gaming machines 200, 300. Within the context of the present invention, gaming machines 200, 300 include machines that enable the player to plays games of chance while entertainment machines 400 include machines that enable the player to play games of skill, to watch entertainment materials or to even participate in interactive entertainment sessions with groups of players or other individual players. Monetary payouts from games of skills and entertainment machines 400 are usually illegal and prizes may commonly be awarded in the form of longer play sessions or ranking into a higher skill level.

Central server(s) 12 may be located on the same premises as the gaming machines 200, 300, entertainment machines 400 and PVUs 500, 600, 700 or elsewhere. A plurality of servers 112 may be used in various configurations. For example, the server(s) 112 may be located on same premises for fault tolerance backup, located on different premises for disaster tolerance backup, located on same or different premises for load balancing and/or configured in a hierarchical structure, whereby a hierarchically-higher server 112 provides consolidated services for one or a plurality of hierarchically-lower servers 112.

Figure 2:
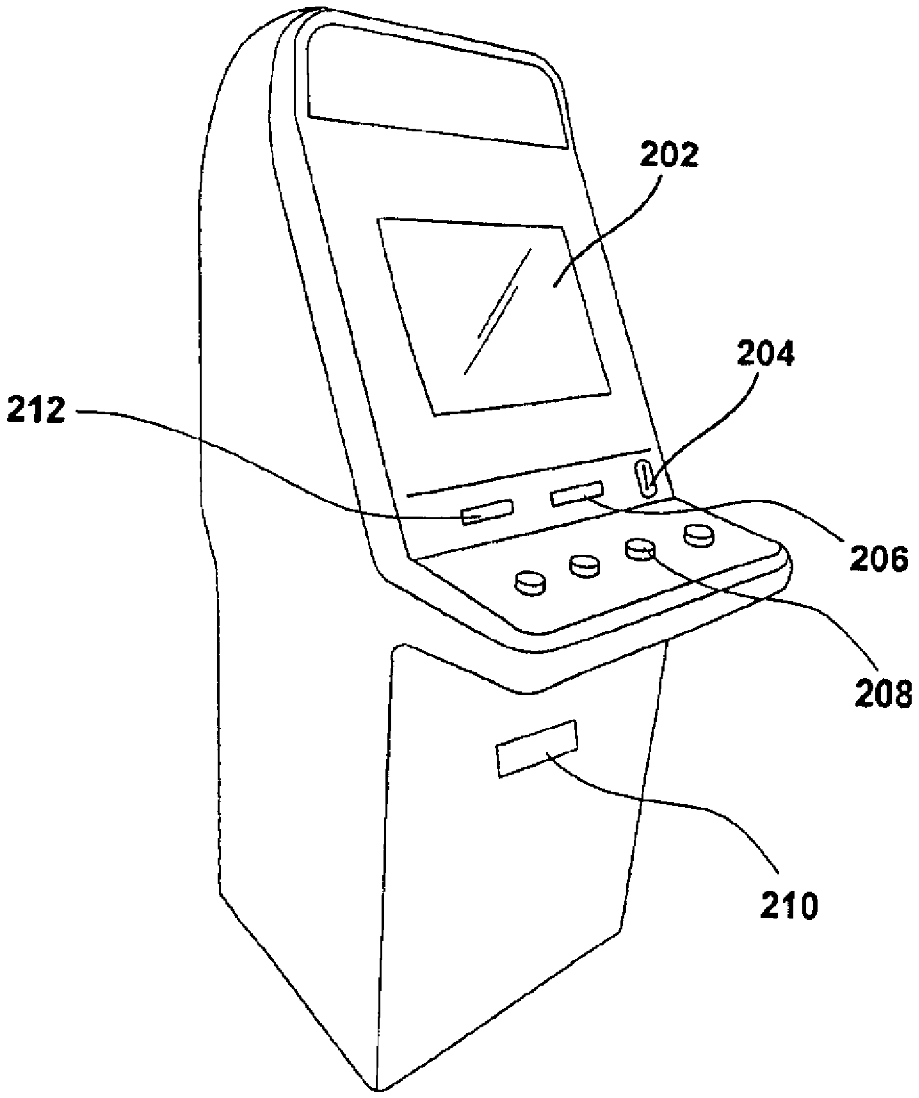
FIG. 2 is a diagram of an exemplary cash gaming machine in accordance with an embodiment of the present invention.
Figure 3:
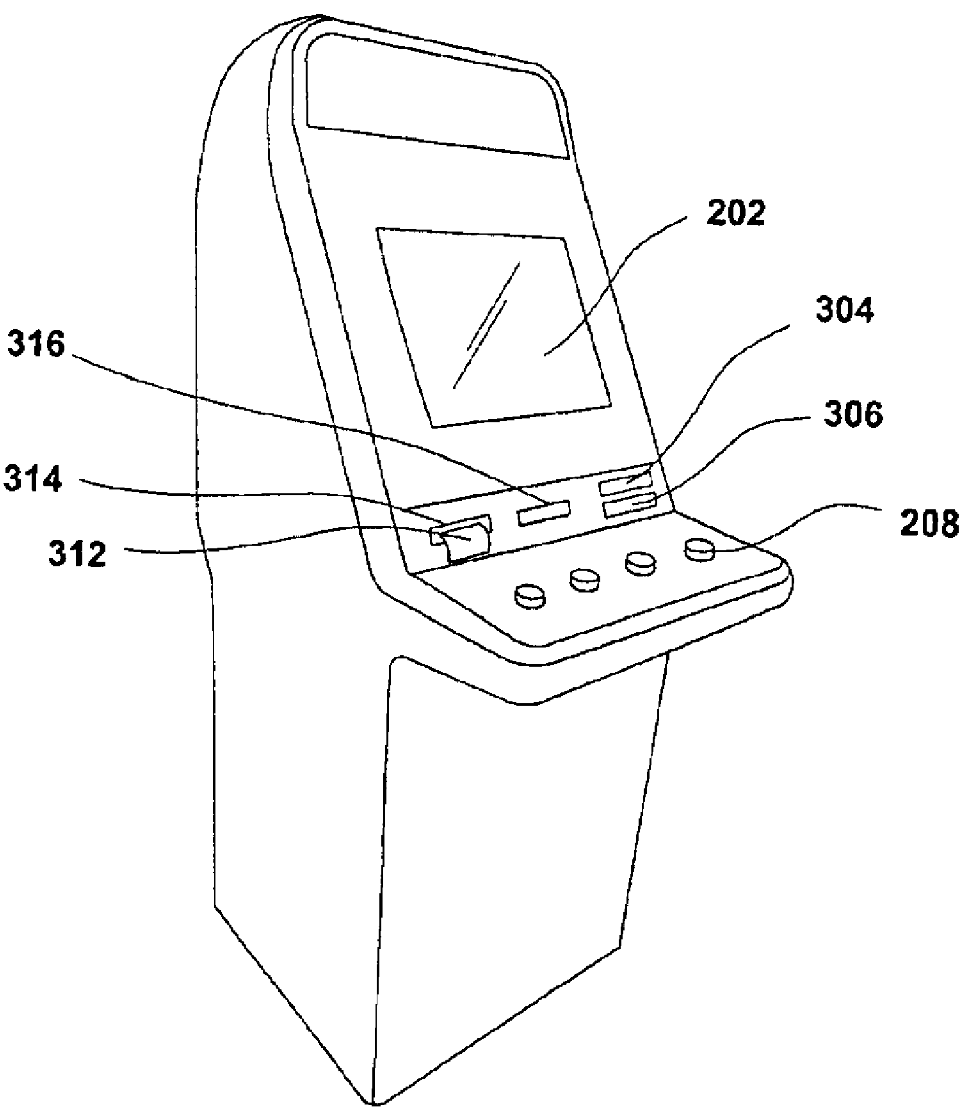
FIG. 3 is a diagram of an exemplary cash-less gaming machine in accordance with an embodiment of the present invention.

FIG. 2 illustrates a gaming and identification verification machine 200 that accepts and redeems cash. It is to be understood that the gaming machine 200 is but one possible implementation of such gaming machines and that the present invention is not limited thereto. Indeed, the system 100 may include any mix of any gaming and/or entertainment machines of most any kind. The gaming and identification verification machine 200 may include a display 202, a coin acceptor 204, a banknote acceptor 206, a coin hopper 210, a gaming machine identification (hereafter, "ID") device 212 and a plurality of user interaction means 208, which may include buttons, trackballs and/or joysticks, for example. The gaming machine ID device 212 is commonly used for identifying players that subscribe to a loyalty program to benefit from advantages and promotions offered by the gaming operator. FIG. 3 illustrates an exemplary cash-less gaming machine 300 that does not accept or redeem cash. It is to be understood that the gaming machine 300 is but one possible implementation of such a cashless gaming machine and that the present invention is not limited thereto. For cash-less operation, a gaming device ID device (s) 304, 306 is/are necessary. The gaming machine ID device 304, 306 may include a magnetic card reader, a SmartCard reader and writer, a barcode reader, a ticket printer, a biometric reader, a touch-screen, keyboard or keypad to enable players to enter a PIN (Personal Identification Number) and/or a "Pay" button. The gaming machine identification device 304, 306 may further include an ID token reader to read other forms of advanced ID devices such as ID buttons, ID key-chains (such as disclosed, for example in commonly assigned US design patent entitled "Personal Communicator and Secure ID Device" patent number D441, 765 issued on May 8, 2001) as well as secure communication means for securely communicating with, for example, personal wallets, hand held PCs or computer wrist-watch via infra red, magnetic field, capacitive charges or RF (Bluetooth, EEE 802.11, etc.) for player identification purposes. According to one embodiment of the present invention, a player initially establishes a player account with the central server(s) 112 and receives a player ID card or ID token bearing the player's account number and other relevant information. Alternatively, gaming machine 200, 300, may include a printer 314 (FIG. 3) to provide the player with a printed ticket 312 including a human and/or a machine-readable ID code. Alternatively, the printed ticket 312 may be provided by the PVU 500, 600 or 700 and read by the gaming machine 200, 300 via a ticket reader 316. Alternatively still, the player may register a biometric feature such as fingerprint, voiceprint and/or face print, and a PIN to be entered whenever confirmation of identity is required. All of these ID devices may allow the player to remain anonymous; in that case, the player's personal information is not requested and the assigned or chosen ID is associated with a numbered account instead of a personal account. Wager debits and prize credits are controlled by the central server (s) 112. Players may redeem any account balance by pressing the "Pay Button" (which may halt the current gaming session) and by claiming the funds from a cashier that is connected with the central server(s) 112. A machine coded (e.g., bar coded) printed ticket 312 may be generated by the gaming machine 200, 300 as additional means for claiming the funds or to begin a new game session on another gaming machine 200, 300 by causing the ticket reader 316 of the other gaming machine 200, 300 to scan the machine code on the printed ticket 312.

Electronic purses such as those based on the SmartCard technologies may also be used, either in on-line or off-line modes, although off-line operation is to be avoided to preclude latent and under-the-radar fraud, especially from inside employees.

Figure 4:
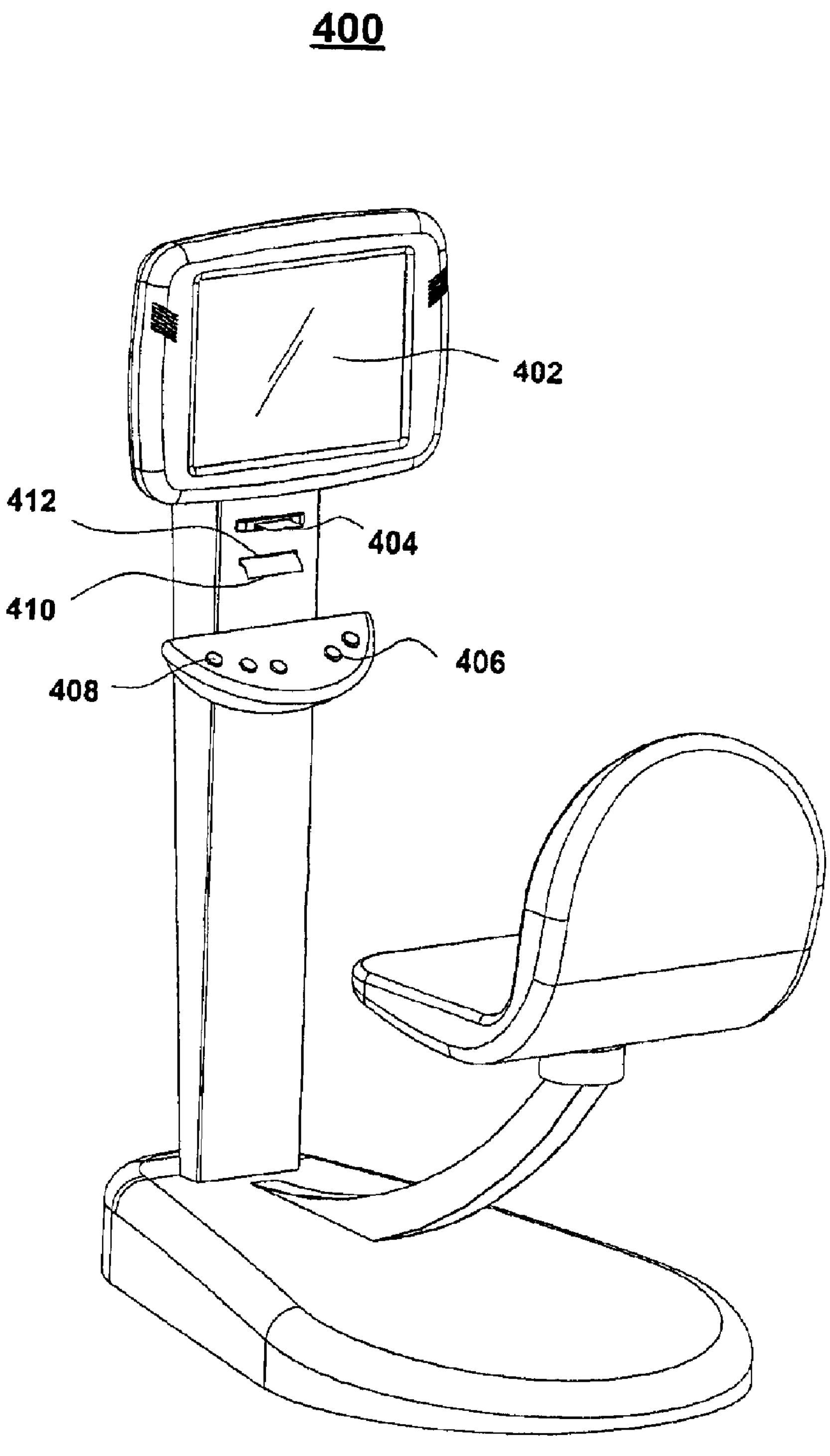
FIG. 4 is a diagram of an exemplary entertainment machine in accordance with an embodiment of the present invention.

FIG. 4 illustrates a cash-less entertainment machine 400 including the following identification and payment means: a magnetic card reader or a SmartCard reader/writer 404, a ticket printer 412 for printing a ticket 410, a touch-screen 402 (and/or a keyboard or keypad) to enter a Personal Identification Number "PIN" and one or more buttons 406, 408, at least one of which may be a "Pay" button. It is to be understood that the gaming machine 400 shown in FIG. 4 is but one possible implementation of such an entertainment machine and that the present invention is not limited thereto. The entertainment gaming machine 400 may further include a biometric reader such as voice recognition (for example), to enable medialess identification means. The entertainment machine 400 may be configured for cash-less and/or for cash payment. Such entertainment machines 400 may have more than one screen, may allow for 3D, 360-degree vision and/or immersive vision, may include advanced interactive controls, force feed-back, motion feed-back, motion control, immersive sound and/or any technology that enhances the player's entertainment sensory experiences. Moreover, the entertainment machines 400 and/or gaming machines 200, 300 may further include a video camera to allow for face-to-face action, face ID recognition, creation of avatars (movable three-dimensional images that may be used to represent a person or part thereof—such as a head—in cyberspace) and the like. Incorporating functionality for identifying players based upon a recognition of their facial features in the entertainment machines 400 and/or the gaming machines 200, 300 would allow any pre-registered person to be immediately greeted and his or her account retrieved as soon as he or she stands by the entertainment machine 400 and/or the gaming machine 200, 300. Alternatively still, entertainment machines 400 may enable the player to participate in a game of chance while offering the player a superb multimedia and sensorial experience.

Because of the technical similarities and potential functional overlap between gaming machines 200, 300 and entertainment machines 400, the term "gaming machine", as used herein below will collectively refer to both gaming machines 200, 300 and entertainment machines 400 and/or any variant or combinations thereof.

Figure 5:
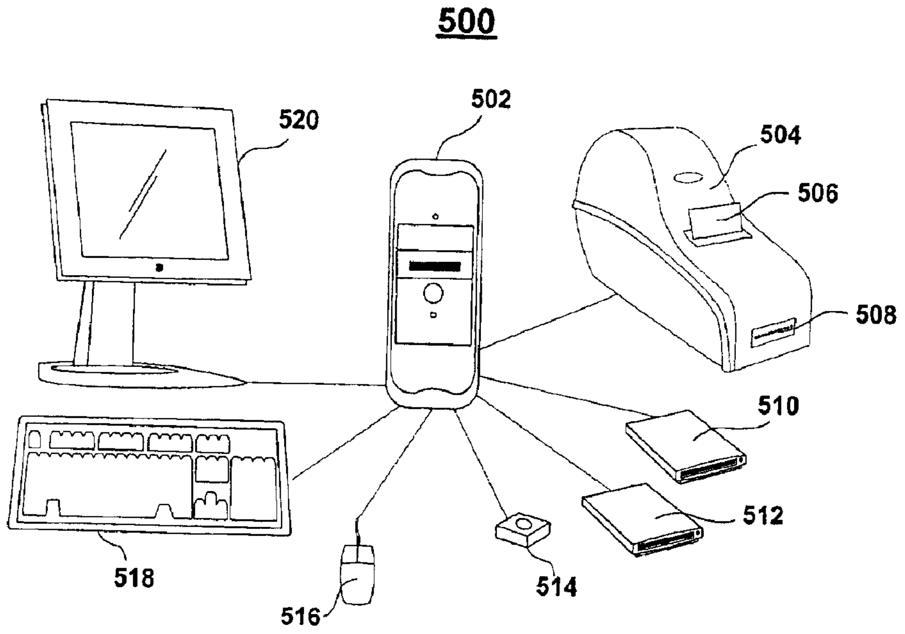
FIG. 5 is a diagram an exemplary PVU (Payment Verification Unit) in accordance with an embodiment of the present invention.

FIG. 5 illustrates a payment verification unit or PVU 500, according to an embodiment of the present invention. The PVU may include a computer 502 connected to the network 102 with the gaming machines and/or the central server(s) 112 and a ticket printer 504. The ticket printer 504 may include an integrated printer for printing tickets or receipts 506 that include a human and/or machine readable code imprinted thereon and code reader 508 for reading the code(s) imprinted on the ticket 506. The PVU 500 may also include, for example, a magnetic card reader 510, a SmartCard reader 512, a biometric reader 514 (such as a fingerprint reader, for example), a display 520 and input devices such as a keyboard 518 and/or a mouse 516.

When a player wishes to redeem the credit available in his or her account, the player may consult a nearby cashier equipped with a PVU 500 who may identify the player's account using one of the ID media provided by the player, query the central server(s) 112 for payment authorization, and proceed with payment. When processing the payment authorization, smart pattern analysis software may be used to detect possible fraud resulting from counterfeiting whereby (for example) the player would deposit some cash funds for credit to his or her account, play very small wager amounts then claim the totality of the balance at another cashier. In that case, there is a high probability that the coins or notes remitted by the player may be counterfeits or originate from suspicious origin. The PVU 500 may also be used for crediting the player's account when the player remits cash to play on one of the cash-less gaming machines.

Figure 6:
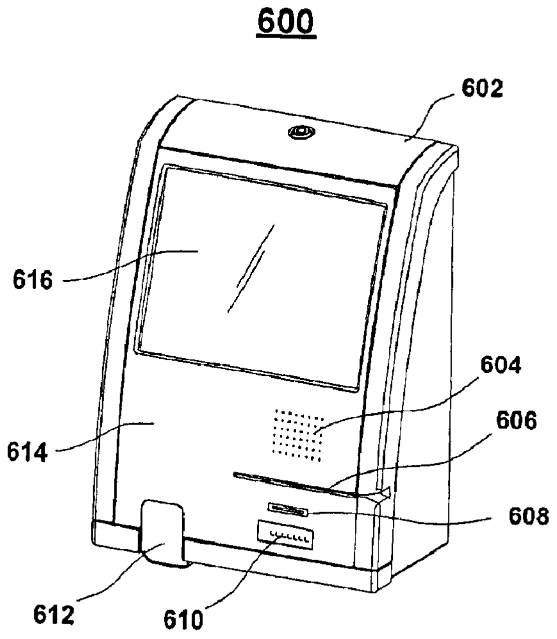
FIG. 6 is a diagram of an exemplary compact PVU in accordance with an embodiment of the present invention.

FIG. 6 illustrates a compact version of the PVU 500, according to another embodiment of the present invention. The PVU 600 may include an enclosure 602, a data display 616 (which may include a touch screen), a magnetic card 606, a smart card reader 608, a printed ticket exit 612 through which a printer (internally mounted, not shown) dispenses printed tickets or receipts, an optical reader 610 and/or a speaker 604, for example. The optical reader 610 may include a barcode reader or most any machine vision system. The printer and the optical reader 610 may draw, for example, from aspects of the printers and scanners disclosed in commonly assigned and co-pending U.S. patent application Ser. No. 09/441,040 filed on Nov. 16, 1999 entitled "Compact Configurable Scanning Terminal" and/or Ser. No. 09/782,839 filed on Feb. 14, 2001 and entitled "Compact Document Scanner with Branding", the disclosure of each is incorporated herein in its entirety.

Figure 7:
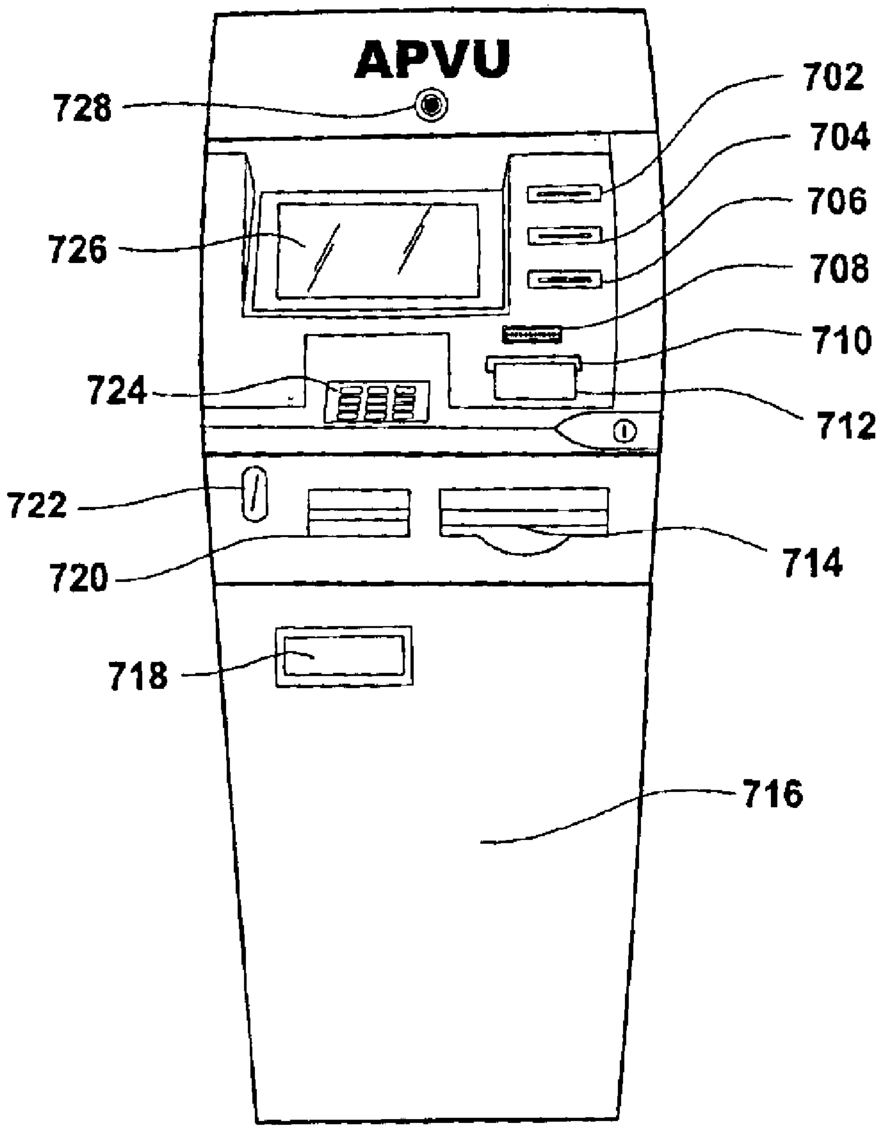
FIG. 7 is a diagram depicting an exemplary Automatic PVU (APVU) or "Smart Cashier" in accordance with an embodiment of the present invention.

FIG. 7 illustrates an embodiment of an automated PVU or APVU 700, which dispenses with the need for a human cashier. The APVU 700 may include an internal computer connected to the network 102 with the gaming machines and/or the central server(s) 112, a coin acceptor 722, a note acceptor 720, a coin dispenser/hopper 718, a SmartCard or magnetic card dispenser 704, a note dispenser 714, a ticket printer 710 for printing a ticket 712, a magnetic card reader 702, a SmartCard reader/writer 706, a barcode reader 708, display with touch-screen 726, a keypad 724, a video camera 728 and/or a UL 291 certified cash safe 716, for example. The UL 291 certified cash safe 716 prevents robbery of the cash stored inside the APVU 700. The APVU 700 may further include biometric ID readers, ID token readers to read other forms of advanced ID devices such as ID buttons, ID key-chains, etc. as well as secure communications means for communicating with personal wallets, hand held PCs or computer wrist-watch via infra red, magnetic field, capacitive charges or RF (Bluetooth, IEEE 802.11, etc.) for identification purposes.

When a player wishes to redeem the credit available in his or her account, the player may consult a nearby APVU 700 or "smart-cashier" who will identify the player's account using one of the ID media provided by the player, query the central server(s) 112 for payment authorization, then proceed with cash payment via the coin hopper 718 and note dispenser 714, for example. When processing the payment authorization, smart pattern analysis software may be used to detect possible fraud. The APVU 700 may also allow the player to credit directly his or her account by remitting cash via the note acceptor 720, the coin acceptor 722 or alternatively via Electronic Fund Transfer ("EFT") with his or her bank account, to play one of the gaming machines. Any of the ID media may be used to allow the player to play on any of the gaming machines connected to the network 102.

Figure 8:
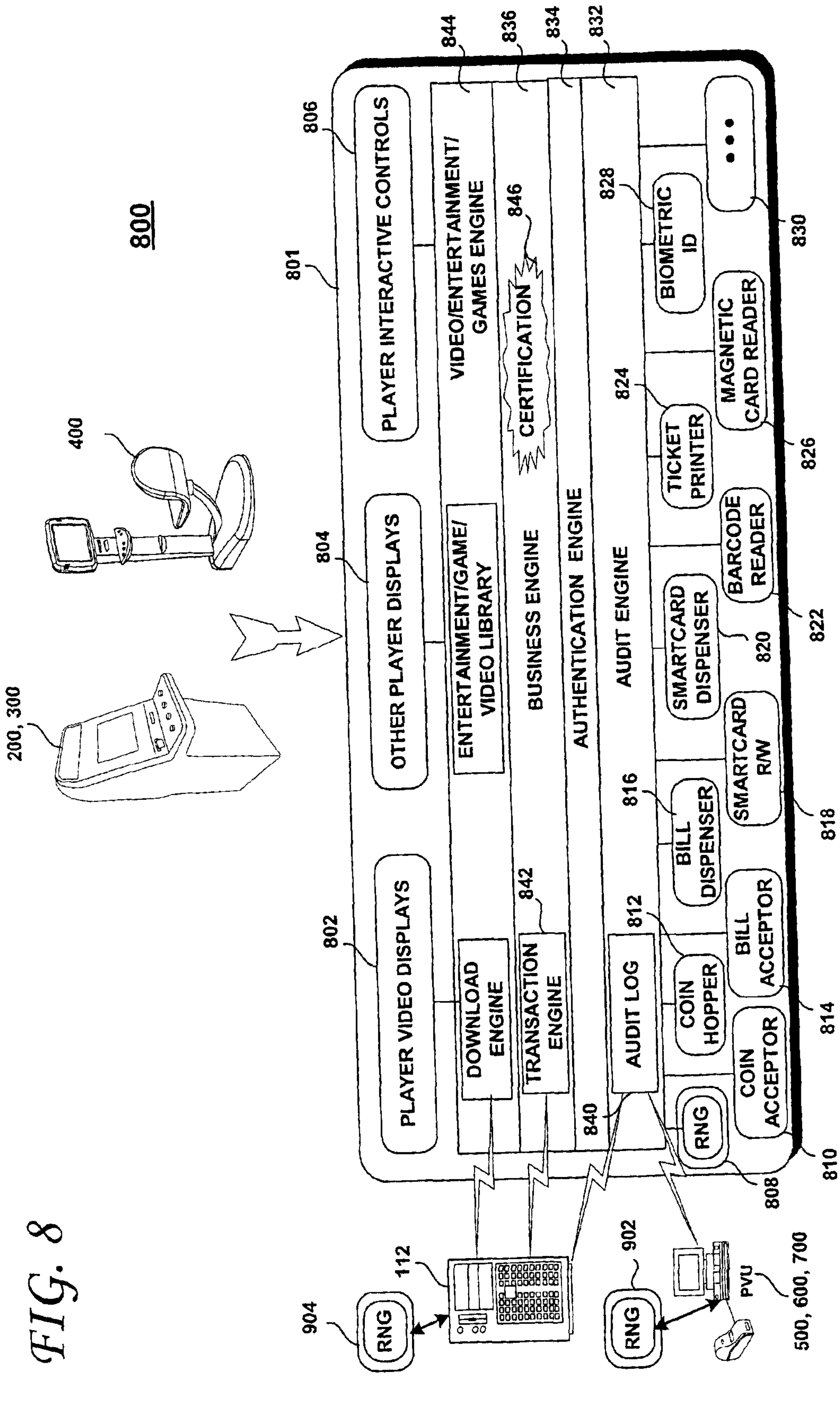
FIG. 8 is a diagram depicting a tightly coupled configuration of a gaming machine in accordance with an embodiment of the present invention.

FIG. 8 illustrates a typical tightly coupled configuration that may be used with the present gaming machines. The gaming machine main processing platform may be built on a PC or equivalent hardware platform 801 that communicates with the central server(s) 112 and the PVU 500, 600, 700 via a network link. In addition to the PC platform, operating system, low level software, power supply, the main enclosure and any physical intrusion security, a gaming machine according to the present invention may include payment and identification devices, high-level application software modules, network communication means for enabling the gaming machine to exchange data with external devices (such as the central server(s) 112 and the PVU 500, 600, 700). The present gaming machine may also include an internal true RNG 808 (Random Number Generator) or means for receiving random combinations via the network 102 from external devices.

A hardware RNG is extremely desirable in order to ensure maximum entropy of encryption of the secret keys such that the encrypted keys are formed of true random bits, thereby rendering a brute force attack thereon to its maximum theoretical level of difficulty. An embedded true RNG based on diode noise, for example, enables systematic use of the highest encryption strength for the encryption algorithms and key length allowed by government. Flaws in RNGs and badly chosen encryption keys are responsible for highly publicized cracked systems. Although 128-bit encryption such as RSA, 3DES, etc. requires a considerable theoretical computer power to crack, a badly chosen encryption key may result in the secret keys being cracked within hours. There is a need to provide the gaming machines and external sources of random numbers coupled to the present gaming machines with almost "Military Defense Class" security. Virtual private Networks (VPNs), Secure Socket layer (SSL) and other secure communication protocols that rely on locally generated encryption keys are solutions that are widely available today. The resilience of such encryption protocols to attack depend on the quality of the encryption keys or their maximum entropy, such as discussed in Schneider, *Secrets and Lies: Digital Security in a Networked World* Wiley& Sons, Inc.© 2000, pages 102–106, which is incorporated herein by reference.

The present gaming machine may also include one or more player video displays 802 driven directly by a multimedia controller within the gaming machine or driven externally thereto, one or more non-video displays 804 such as status indicators, digital indicators, mechanical indicators, blinking lights illuminations and the like and one or more player interactive controls 806 such as a one-arm bandit handle, push-buttons, trackballs or a joystick. As shown, the payment and identification devices of the present gaming machines may include a coin acceptor 810, a coin dispenser or hopper 812, a bill or note acceptor 814, a bill dispenser 816, a smart card reader and writer 818, a smart card dispenser 820, a bar or other machine readable code reader 822, a ticket printer 824, a magnetic card reader 826, a biometric ID reader 828 and/or other devices, generically referenced at 830. The payment and identification devices may advantageously be coupled to the platform 801 via RS232/RS485 or similar connections.

The payment and identification devices listed above are collectively referenced herein as "specialized devices" herein below and may not all be present in a given gaming machine configuration. For example, a gaming machine may only be configured for cash-less payment using voice ID; in that case, only a microphone and touch-screen (and/or display and keypad) need be present. Moreover, the list of specialized devices above is not limitative, as new specialized devices may become available such as interfaces with personal wallets, contactless smart cards or ID tokens, for example. Any such specialized devices may readily be incorporated within the present gaming machines. It is to be noted that the purpose for listing a significant number of specialized devices is not to recommend equipping gaming machine with each listed specialized device, but rather to teach the benefits of designed-in modularity, as is discussed in detail herein below. Furthermore, the same architecture may be advantageously applied to the APVU 700 (Automated Payment Verification Unit or Smart-Cashier).

In legacy gaming machines, the connection between specialized devices and the processing hardware is rather ad-hoc, as a wide variety of interfaces are encountered such as RS232, RS422, Parallel, via dedicated add-on board, etc. More recent specialized devices are now capable of providing a Universal Serial Bus ("USB") interface. However, all of these devices require that special software (software device drivers) that understands the inner characteristics of the hardware be developed. Software device drivers are well known to be difficult to develop and to introduce computer instabilities and limitations, especially when there is a large number of devices that may give rise to resource sharing conflicts.

As shown in FIG. 8, the high-level software application modules for a gaming machine according to the present invention may include an audit engine 832, an authentication engine 834, a business engine 836 and/or a video entertainment/game engine 838. The audit engine 832, as a passive observation layer, transparently intercepts all the important events and all regulatory critical parameters associated with the operation of the specialized devices such as cash/cash-out or submitted identification information, the serial numbers of all connected devices and generates a non-modifiable reference audit log 840 that may consulted by the central server(s) 112 or the PVU 500, 600, 700. In addition, the audit engine 832 compares all devices connected to the gaming machine with a map of authorized regulatory configurations and may alert responsible personnel and/or regulators whenever non-valid device configurations are encountered, such as may occur after replacing devices or relocation of the gaming machine. The audit engine 832 may include instantly accessible non-volatile data storage, which data storage may be locally or remotely located (accessible via network 102). This would allow resolving data coherence and correctness in case of power failure, interruption, virus infection and/or software crash so as not jeopardize the accuracy of the game record keeping. For example, the audit engine 832 allows resolving conflicts wherein a record indicates a win and a payout amount although a power interruption has prevented the full payout from occurring. Moreover, the audit engine 832 may keep very specific accounting data as required by a given jurisdiction to meet locally applicable gambling regulations. For example, the audit engine 832 may keep a log of each drawn random number combination for audit purposes.

The audit engine 832 may keep audit trails separately for all of the different forms of monetary value that may be accepted by modern gaming machines such as, for example, audit trails of all wagers found in the coin and currency cash boxes. In gaming machines equipped with coupon readers, audit trail of the currency box may contain bar coded coupons of varying amounts in addition to cash. In the case of cashless wagers (e.g., those placed from player charge accounts or using some form of electronic money), as there is no currency in either of the coin or currency cash boxes, the audit trail may include relevant information exchanged during the player identification process, retrieval of the balance held in the central server(s) 112, the wager debits and the prize credits, for example.

The authentication engine 834 may include functionality to consult a Certificate Authority (which may be located on a server on the network 102 or on a computer network connected thereto), certify the authenticity of the identification presented, authorize a given operation, ensure data integrity of data exchanged, securely time-stamp the operation (to ensure non-repudiation of the operation) and/or revoke illegal identifications, for example.

The business engine 836 handles the games rules and the associated bookkeeping and may be subject to regulatory requirements. The business engine 836 handles the business aspects of the game and/or entertainment provided, controls wagers and maintains the prize matrix. This software application module customarily requires extensive testing by an independent laboratory to receive the certification mandated by local regulatory requirements. The regulatory requirements essentially insure that funds are reliably disbursed to legitimate players and insure that funds are not acquired by other individuals because of flaws, cheating and/or stealing.

The business engine 836 may include a transaction engine 842 for online operation with the central server(s) 112. In the case of game of chance, the video/entertainment/gaming engine 844 receives the current draw from one or more random number generators 808 located inside the gaming machine or outside the gaming machine (see reference numbers 902 and 904 in FIG. 8), in accordance with local regulatory requirements. In case of games of skills, the gaming engine 844 receives the bonus from the business engine 836 in accordance with a given skill strategy, which may also require certification by a regulatory body and compliance with local regulatory requirements. An example of skill strategy may be rapidity, precision, ability to reach a given score, intelligence, memory, ability to focus on critical events amongst less critical events, etc. The business engine 836 may have received the applicable regulatory certification as illustrated by the star-shaped stamp 846.

The video/entertainment/game engine 844 communicates with the business engine 836 to translate the business rules into an attractive interactive experience for the player. Indeed, the video/entertainment/game engine 844 handles the player user interface, the multimedia interactive and entertainment and game graphics, sound, motion feedback and video streaming. The video/entertainment/game engine 844 may include a library 838 that offers a variety of entertainment multimedia, game multimedia and video streaming to suit the player's taste and expectations, as well as to accommodate a given strategy formulated by the game operator. For example, the engine 844 and library 838 may implement the methods and systems disclosed in commonly assigned and co-pending U.S. patent application entitled "Methods And Systems For Electronic Virtual Races", Ser. No. 9/838,563 filed on Apr. 19, 2001, the disclosure of which is incorporated herein.

The central server(s) 112 provides on-line control of the gaming machines, the PVU 500, 600 and APVUs 700. A preferred embodiment of the present invention is for the central server(s) 112 to instantly capture all the critical events occurring within the entire gaming system 100, including for example when each coin is inserted in the coin acceptor 810, noting its value as well as each coin rejection event. Further operation of the gaming machine may be prevented upon failure of the network 102. This principle is the basis of operation of large lottery systems, whereby thousands of terminals are deployed in remote areas. Such a model has proven to be extremely successful at avoiding fraud, including fraud committed by employees having access to sensitive data such as program source code. Performance is not an issue, as central server(s) 112s may use a farm of Intel Pentium® (for example)—based servers and a transactional protocol such as described in commonly assigned and co-pending patent application entitled "Fast Web Interface Server, Network Architectures And Systems Using Same" Ser. No. 09/565,579 filed on May 4, 2000 and commonly assigned and co-pending U.S. application entitled "Trusted Transactional Set-Top Box" Ser. No.: 09/862,165 filed on May 21, 2001, the disclosures of which are incorporated herein by reference, may handle tens of thousands of transactions per second with a guaranteed latency for each individual transaction no greater than 200 milliseconds.

Figure 9:
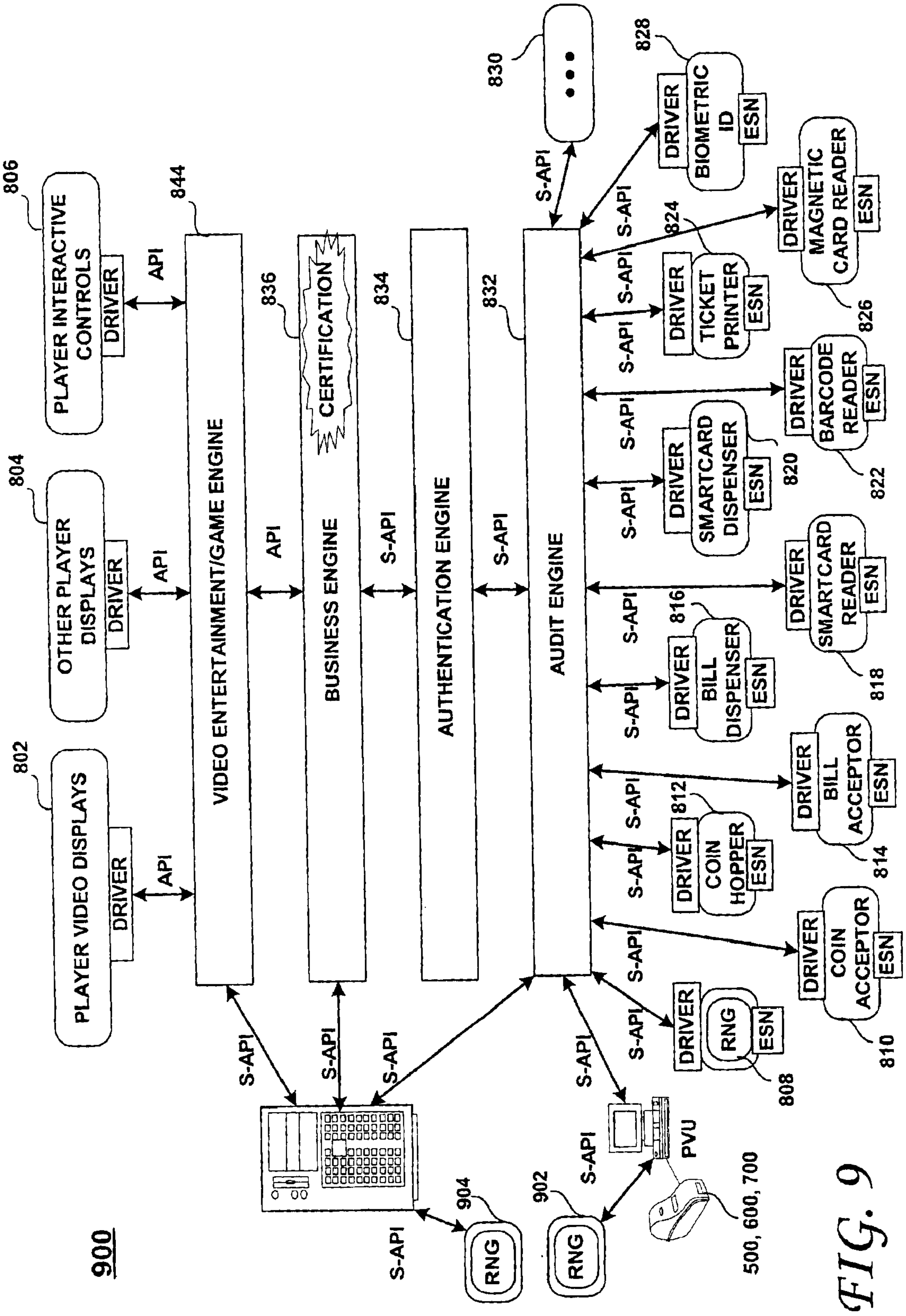
FIG. 9 is a diagram depicting a modular software architecture of a gaming machine in accordance with an embodiment of the present invention.

FIG. 9 illustrates a modular configuration that may be applied to a gaming machine according to the present invention, in which the gaming machine includes the same elements as described above but arranged in a modular fashion with their software Application Programming Interfaces or APIs clearly identified. Moreover, Secure APIs or S-APIs are also employed when data and programming security are essential. As represented in FIG. 9, the constituent elements of the present gaming machines communicate with one-another only via their associated APIs or S-APIs.

It is to be noted that APIs not only define the exchange of information between the adjacent modules but also define how one module may provide services that may be consumed by the other. In this manner, one module may be made to control another module. The specialized devices are assumed to possess the necessary embedded processing resources to control the entire operation of the device and to communicate with high-level application software via a clearly defined API or S-API. In FIG. 9, the capability to control the hardware is represented by the elements named "Driver"; consequently, the low level details necessary to operate the specialized device are not made available to the high-level software module. According to the present invention, the device drivers are either part of the embedded software of the specialized devices or form part of the software of the platform 801 (such as a PC or other computing platform), as to offer an API to the audit engine 832. Each specialized device is also assumed capable of supplying its identity to the central server(s) 112; this is represented by the element named "ESN", which is an acronym for Electronic Serial Number. It is advisable to rely on secure means of authentication that may cooperate with the authentication engine 834 to ensure that the ESN is not associated with an illegal specialized device. The authentication engine 834 may advantageously maintain a registry of authorized devices and may dispatch alerts to prevent illegal devices from operating. The player video displays 802, other player displays 804 and player interactive controls 806 are preferably modular devices capable of communication via a clearly defined API. Moreover, the audit engine 832 may read and record the serial numbers of each device connected to or coupled with the gaming machine.

At least the high-level engines 832, 834, 836, and 844 may communicate with the central server(s) 112 and/or the PVU 500, 600, 700.

The RNG (random number generator) located within the gaming machine 808 preferably behaves in the same manner as a specialized device and, therefore, has the same networking, API and secure communication characteristics, requirements and behaviors. The gaming machines may selectively receive random numbers for the game draw from different sources 902 904 to accommodate the various regulatory requirements mandated by given states or given countries. As represented in FIGS. 8 and 9, the sources for such random numbers may be internal to the gaming machine as shown at 808 (wherein the RNG is configured as a specialized device), may originate from a RNG generator 902 internal or coupled to the PVU 500, 600 or APVU 700 and/or from a RNG generator or generators 904 internal or coupled to the central server(s) 112. According to one embodiment of the present invention, a RNG generator may be provided for each gaming machine 200, 300, 400, each PVU 500, 600, 700 and for each central server 112. For example, a single or a plurality of RNG generators 904 coupled to the central server(s) 112 may provide random number combinations to a large number of geographically distributed gaming machines. Also, a single or multiple RNG generators 902 coupled to the PVU 500, 600 or APVU 700 may provide random number configurations for selected gaming machines at a single location, within a cluster 106 and/or to several clusters 106, as shown in FIG. 1. This configuration offers a great degree of flexibility and allows the present gaming system to meet most any applicable regulatory requirement relating to the RNG generators.

Figure 10:
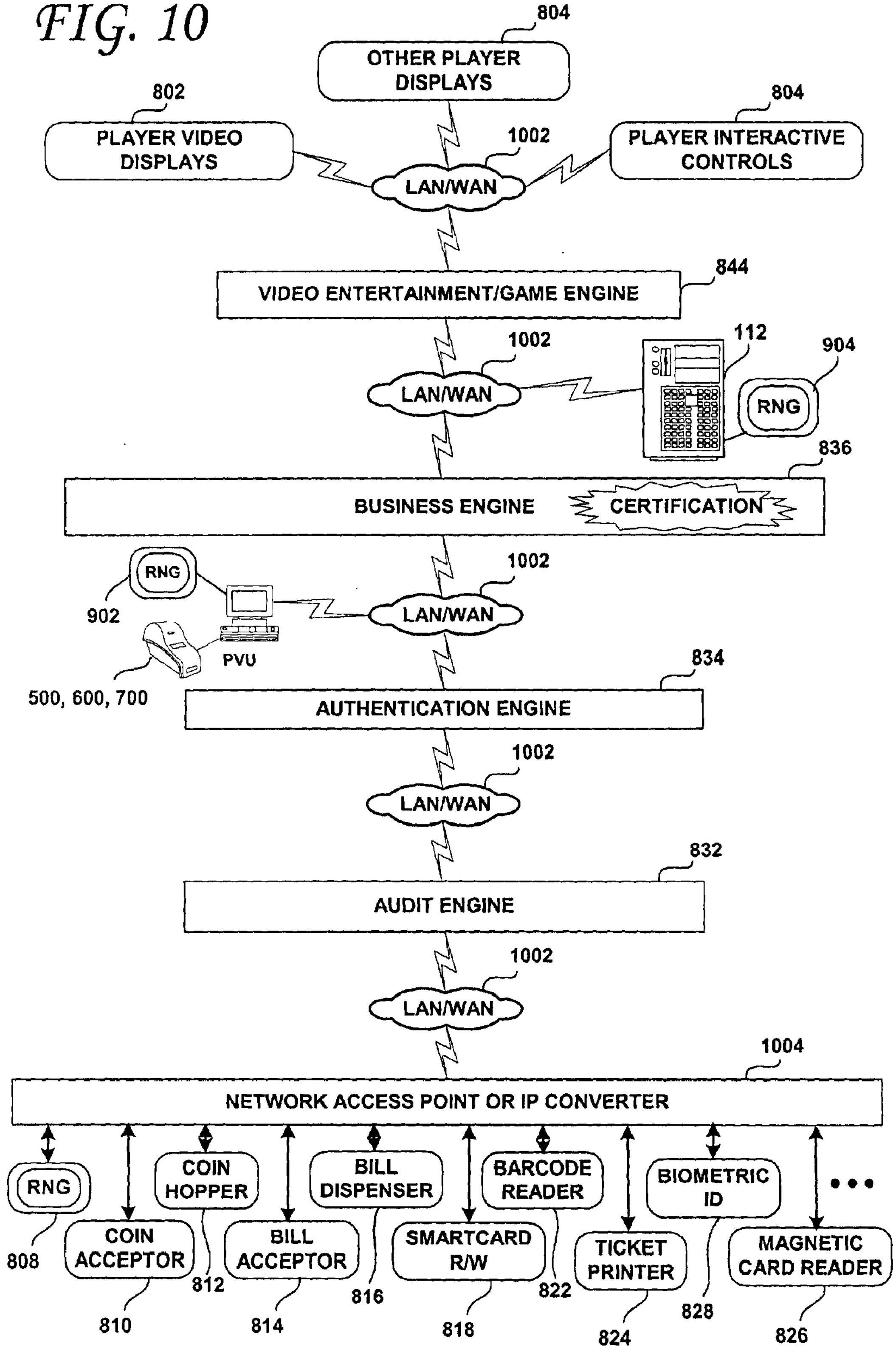
FIG. 10 is a diagram depicting a loosely coupled software configuration of a gaming machine in accordance with an embodiment of the present invention.

FIG. 10 shows another configuration of a gaming machine according to another embodiment of the present invention, showing how components once having a clearly defined APIs may be controlled instead by components via a LAN (Local Area Network) and/or a WAN (Wide Area Network) 1002 via Remote Procedure Calls "RPCs". A more modern control model is object-oriented, whereby a module may offer network services for consumption by other modules. Widely used standards for such object-oriented models include, for example, Distributed Common Object Module ("DCOM", developed by Microsoft Corporation) and Simple Object Access Protocol "SOAP", a vendor independent protocol based on extensible Markup Language ("XML").

It is to be noted that all the modem technologies for offering network services and consuming network services via wired or wireless networks have very high security protection using advanced security techniques such as authentication, encryption, Secure Sockets Layer ("SSL"), Public Key Infrastructure ("PKI"), Kerberos, True Random Number Generators (for generating secret keys with maximum entropy), hopping keys (constantly changing keys), 128-bit Wired Equivalent Privacy ("WEP") algorithm, etc. In addition, a Virtual Private Network ("VPN") tunnel may be used for secure inter-module communication. For example, a VPN tunnel may be established between the bill dispenser 816 specialized device and the central server(s) 112, or one or more software modules located on the central server(s) 112. A preferred embodiment of the present invention is to use the IPSec communication encryption standard that can be conveniently applied as a system wide policy.

Moreover, a "Network Access Point" component 1004 may be introduced that simply allows the APIs of the specialized devices to be directly supported and controlled over the network 102, 1002. These Network Access Points 1004 are sometimes called "IP Converters". Examples of such network access points or IP converters include the USB to Ethernet converter from Inside Out Networks (www.IONetworks.com) and the RS232 to Ethernet from Moxa Technologies (www.moxa.com). Ideally, an Ethernet interface would be directly embedded on processing hardware that controls the specialized device. An embodiment of the present invention includes the use of the IP protocol for intercommunication between each of the modules shown in FIG. 9. Other existing or future protocols may also be used such as, for example, IPX from Novel; however, the IP protocol is universally used for the Internet and many communicating products and components support it. The payment and identification devices may be coupled to the Network Access Point or IP Converter 1004 by an RS232, RS485, USB, 12C, 802.11, Blue Tooth, Ethernet, Fire Wire or most any standardized interface.

Figure 19:
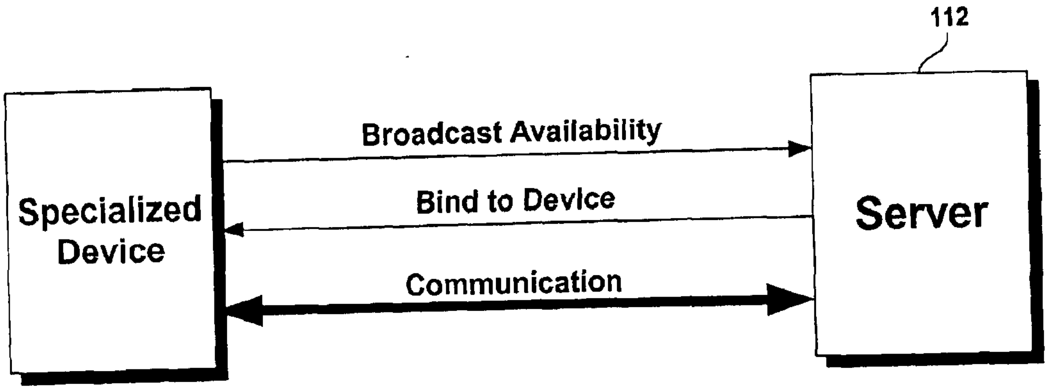
FIG. 19 is a diagram depicting a simplified Plug and Play protocol, in accordance with an embodiment of the present invention.

An embodiment of the present invention includes automatic binding of specialized devices with the central server (s) 112 following their activation for example after power-on or reset. FIG. 19 shows a simplified diagram wherein a specialized device coupled to the central server(s) 112 by network 102 sends, following its activation, broadcast packets over the network 102 indicating its availability. The broadcast packet may contain data identifying the specialized device and describing its location and capabilities. The server 112 that needs to communicate with this specialized device then enters into a binding protocol in order to establish bi-directional communication. A preferred embodiment for the automatic binding is the Universal Plug and Play standard proposal led by Microsoft, although other binding protocols may be used.

Figure 20:
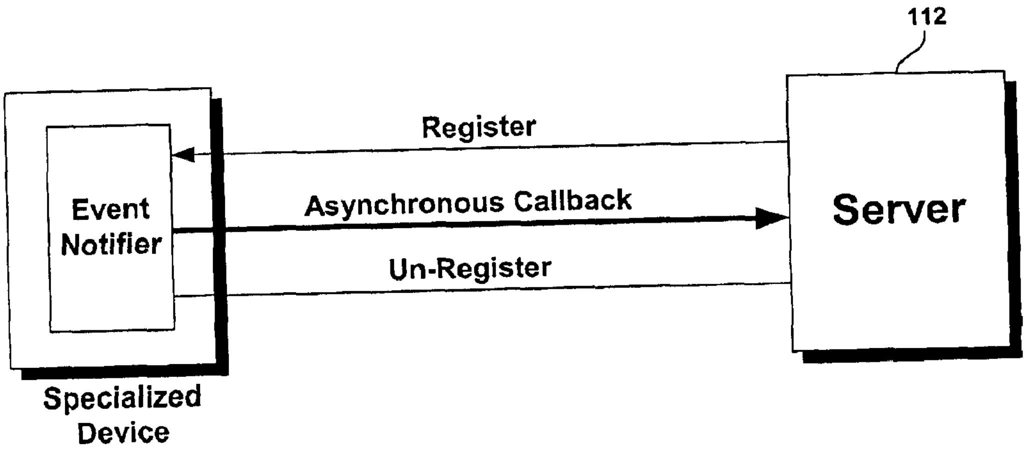
FIG. 20 is a diagram depicting asynchronous notification of events, in accordance with an embodiment of the present invention.

According to another embodiment of the present invention, the specialized devices may be configured to offer asynchronous notification of events directly to the central server(s) 112 over a communication network, such as shown at 102, for example. FIG. 20 shows a simplified diagram wherein a specialized device, coupled to the central server(s) 112 by a network, sends asynchronous notifications packets to the central server(s) 112 following an event being received by the specialized device or an event generated by the specialized device. For asynchronous notification of events, the server(s) 112 may register (subscribe) with the specialized devices for the list of events that are of interest. Then, the event notification process running in the specialized device may produce a call back to the server(s) 112 (thus the name callback) in order to pass details on the event information when it occurs. A mechanism to un-register (unsubscribe) may be provided wherein the server(s) may inform the specialized device to stop sending asynchronous notification of events. A preferred embodiment of the asynchronous notification of events is the callback feature of COM+, DCOM, REMOTING technologies from Microsoft and the callback capability of SOAP, although other technologies may be implement within the context of the present invention.

Figure 11:
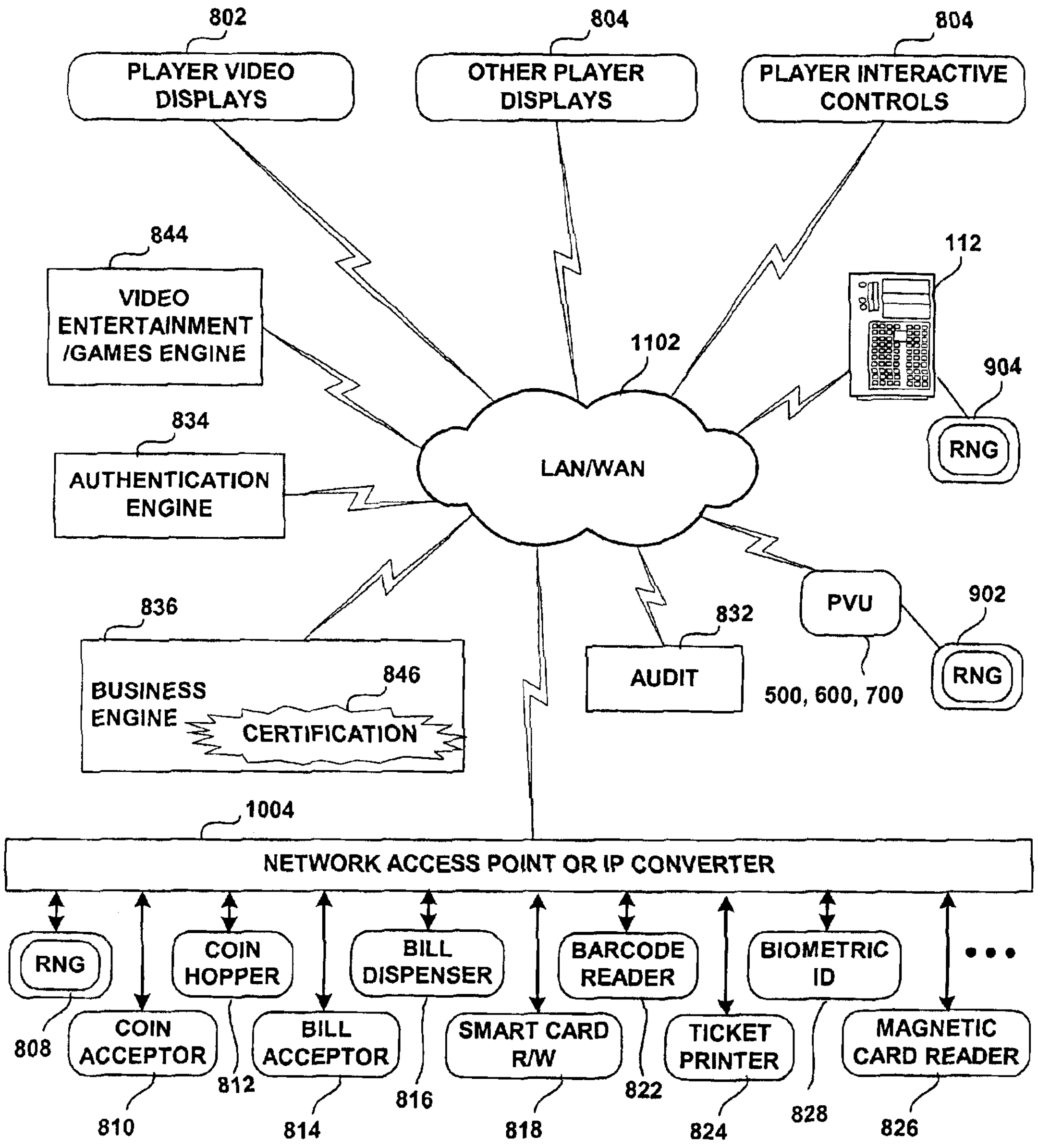
FIG. 11 is a diagram depicting a virtual configuration of the software architecture of a gaming machine in accordance with an embodiment of the present invention.

FIG. 11 shows another embodiment of the present invention, in which the present gaming system is network-centric. In FIG. 11, the network 1102 is the centerpiece thus allowing all the elements internal to as well as external to the gaming machine to interact with one another over the network 102. This wheel and spoke network topology brings great flexibility benefits, as detailed herein under, as it allows virtually any configuration to be chosen for assembling the present gaming machines. For example, the business engine 836 may be located within the gaming machine, within the PVU 500, 600, 700 or within the central server(s) 112. Likewise, the video/entertainment/games engine 844 may also be located within the gaming machine, within the PVU 500, 600, 700 or within the central server(s) 112. The same holds true for the audit engine 832. The video/entertainment/games engine 844 may support real time MPEG compression. For example, the broadband channel between the LAN/Wan 1102 and the video/entertainment/games engine 844 may accommodate video streams encoded using the MPEG4 compression standard (for example) at 100/1000 Mbits/sec, enabling high quality graphics and video to be rendered on the player video displays 802 of the gaming machine(s).

Moreover, the technologies for offering and consuming services over a network such as network 1102 work equally well without any network; consequently the high-level software modules may remain unchanged whether or not a network exists inside the gaming machine for inter-module communication. Thus, the same high-level software modules may be used whether the gaming machine relies on a tightly coupled configuration as shown in FIG. 8 or on a loosely coupled configuration as shown in FIGS. 10 and 11.

The flexibility to configure a gaming machine in a variety of ways and avoid modifying high-level software modules (especially certified modules) is immensely valuable for a company that produces gaming machines to the global market, as regulatory requirements vary significantly from country to country and from state to state. Moreover, a manufacturer may more readily leverage on advanced integrated software development platforms such as Microsoft NET to promote significant re-use of code across the product line, accelerate development time, improve code quality, facilitate code maintenance and upgrade and reduce development cost.

Figure 12:
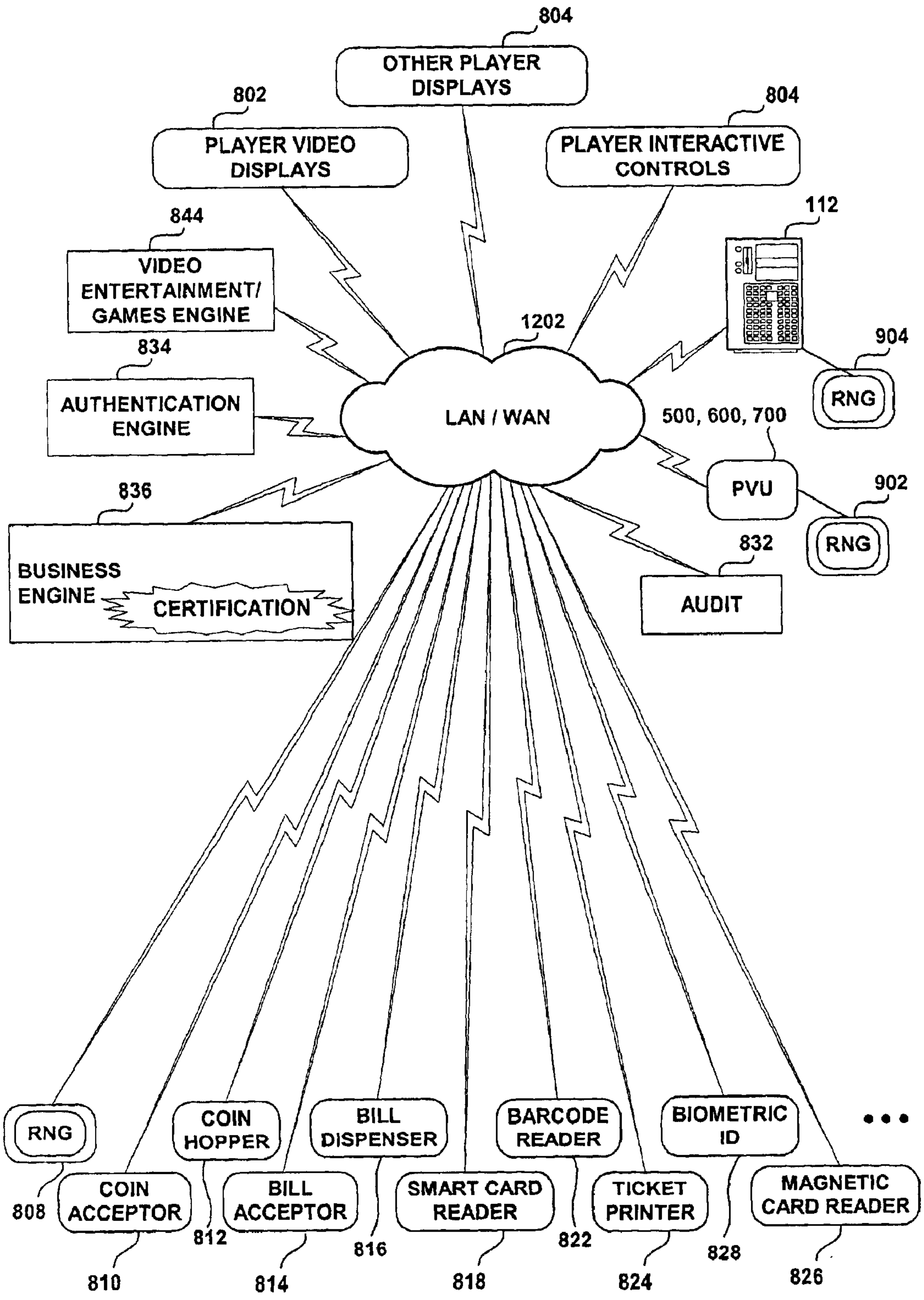
FIG. 12 is a diagram depicting an extended virtual configuration of the software architecture of a gaming machine in accordance with an embodiment of the present invention.

FIG. 12 represents an extension of FIG. 11, in which the specialized devices are directly capable of network communication using, for example, technology developed for smart IP peripherals, according to a still further embodiment of the present invention. Smart IP peripherals are commonly called Internet Appliances. According to an embodiment of the invention, the specialized devices may each be controlled by a processor capable of supporting an operating system such as Microsoft Windows CE, Microsoft Embedded XP or Embedded Linux; IP networking may be carried out via a wired or wireless link. With such advanced operating system, applications may be loaded from the network. Therefore, applications need not bc stored locally within the specialized device, thereby avoiding software upgrade issues. Indeed, application software may be loaded into the gaming machines 200, 300, 400, any specialized device thereof from a remote server 112 and/or from a PVU 500, 600, 700. Similarly, application software may be loaded into the PVUs 500, 600, 700 and/or into any specialized devices therein from a remote server 112. Moreover, the entire operating system of the present gaming machine may be replaced over the network 1202. The operating system may be booted from the network 1202 using PXE (Preboot Execution Environment), for example.

Figure 13:
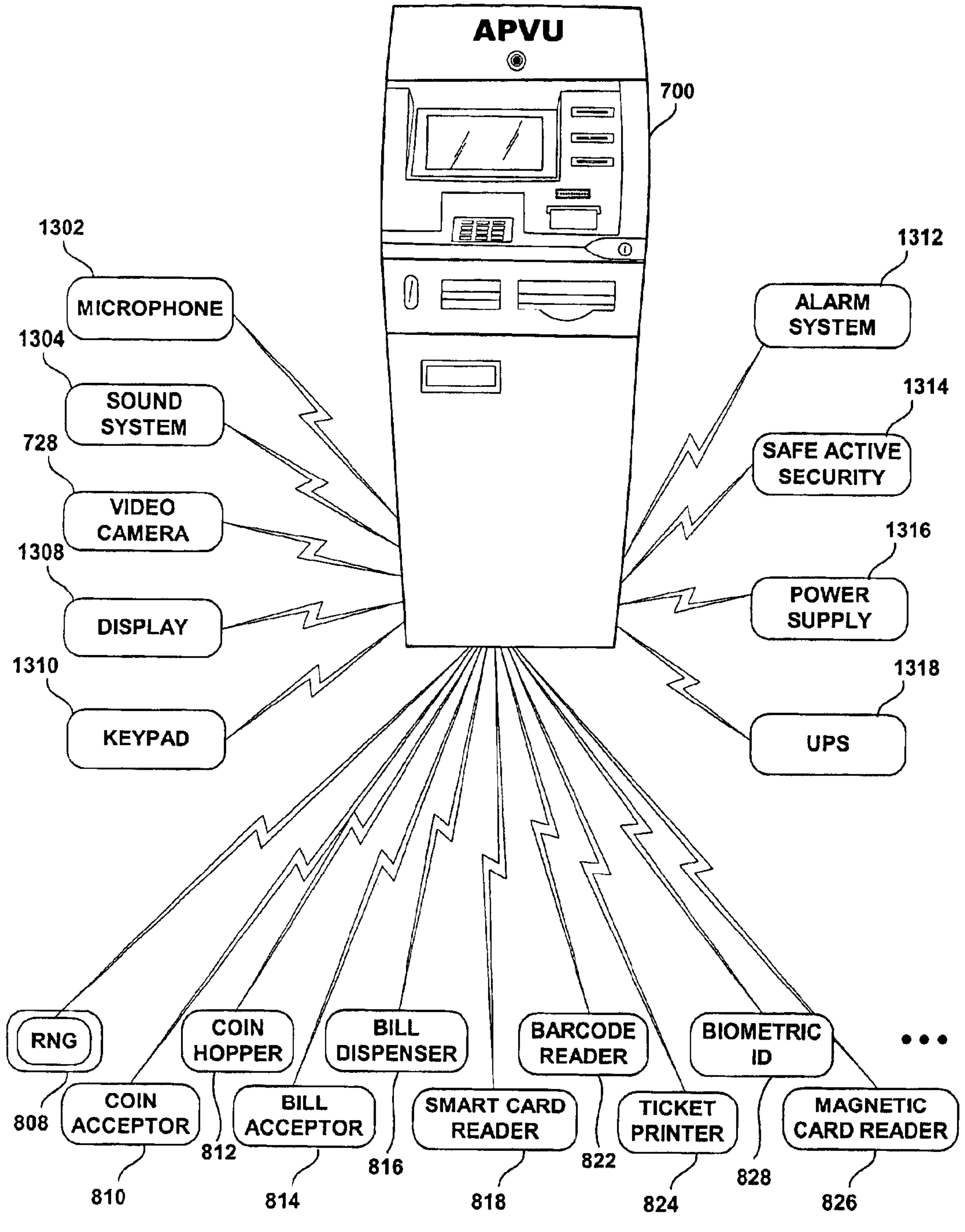
FIG. 13 is a diagram depicting a number of Internet ready specialized devices coupled to an APVU, according to an embodiment of the present invention.

FIG. 13 represents the APVU 700 equipped with IP-Ready specialized devices. These specialized devices are preferably interchangeable with the IP-Ready specialized devices that equip the present gaming machine. Therefore, the APVU's specialized devices may interact directly with the central server(s) 112 via network services, thus benefiting of the same advantages as the gaming machine. As shown, the APVU 700 may incorporate hardware and corresponding software modules for a microphone 1302, a sound system 1304, a video camera 728, a display 1308, a keypad 1310, an alarm system 1312, a active security system 1314 for the internal safe, a power supply 1316 and an Uninterruptible Power Supply ("UPS"). Network Services, as referred to herein, relate to service-oriented architectures such as Microsoft DCOM, Common Object Request Broker Architecture (CORBA), Microsoft Sun J2EE and Sun Java 2 Platform, Enterprise Edition (J2EE), for example. Microsoft NET and Sun J2EE are also commonly referred as "Web Services" and offer a universal solution over the Internet using XML, SOAP, Web Services Description Language (WSDL) and Universal Description, Discovery and Integration (UDDI) standardized technologies. UDDI nodes enables developers to publish web services and enables their software to search for and bind to services offered by others.

Network Services deliver loose coupling services between service requesters and service providers. Service requesters "consume" services provided by services providers. Publication of service descriptions play a central role to enable service requesters to discover available services and bind to them. The service descriptions allow service requesters to bind to the service provider. The service requester obtains service descriptions through a variety of techniques, from the simple "e-mail me the service description" approach to techniques such as Microsoft DISCO and sophisticated service registries like UDDI.

Network services offer a network distributed objects/services infrastructure for transparent activations and accessing of remote objects/services. Objects are typically the EGD's peripherals such as a note acceptor, and the services are the functions performed by the peripheral that are accessible externally via the IP network such as the value of the banknote entered. The central server is typically a service requester. Peripherals are commonly service providers as well as service requesters (consuming services provided by the central server). In the same way, the central server is a services requestor and a services provider.

For the present invention, Microsoft DCOM is a currently preferred technology, as DCOM support is already integrated into Microsoft Windows CE and Embedded XP. In the long term, Microsoft NET web services over a private IP network (or VPN over Internet) may become the preferred technology, as it offers flexible and dynamic discovery of Net/Web services. The notion of a private or non-operator UDDI node is critical to the emergence of a dynamic style of a service-oriented architecture. As of this writing, Microsoft has announced support of NET web services in Windows CE.NET.

Figure 14:
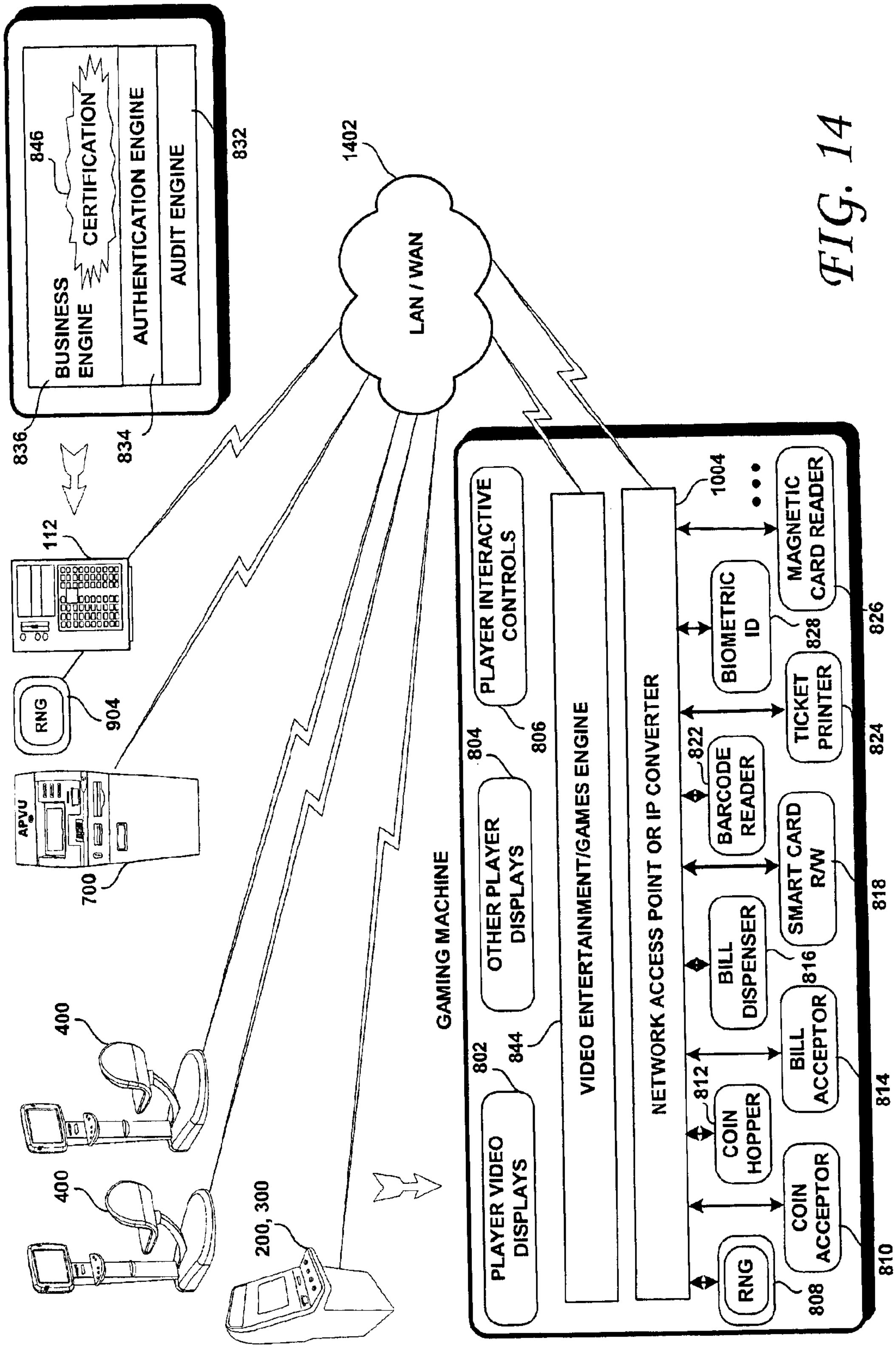
FIG. 14 is a diagram depicting partial processing by central server(s) 112 in accordance with an embodiment of the present invention.

FIG. 14 illustrates a possible configuration that leverages on a virtual configuration architecture in which partial processing may be carried out at the central server(s) 112 (i.e., the gaming machines 200, 300, 400, the PVUs 500, 600, 700 may offload all or a part of their processing to the central servers 112. In this case, the audit engine, the authentication engine and the business engine software modules 832, 834, 836 may be located externally to the gaming machines, such as in the central server(s) 112, noting that the modules securely interact with one another precisely via their APIs, as defined in FIG. 9. That is to say, the specialized devices located in the present gaming machine interact directly with the audit engine 832 located in the central server(s) 112 via network services. In the same manner, the video/entertainment/games engine 844 located in the gaming machine interacts directly with the business engine 836 located in the central server(s) 112. The specialized devices and the video entertainment/games engine 844 located inside the gaming machine do not communicate or interact with one another.

The advantages of the configuration described above include significantly increased data integrity (fully on-line system, fault/disaster tolerant central server(s) 112), significantly strengthened fraud control (fully on-line system, centralized audit log, centralized code execution, quality code, centralized authentication), significantly increased stability (server class operating system, quality code, fault tolerant central server(s) 112), immediate code upgrade capability, accurate and instantly available audit (all the gaming machine critical events are instantly logged in the centralized audit log 840). Moreover, the hardware necessary to support the execution the video entertainment/games engine software module may be a very economical yet extremely multimedia capable game console such as Microsoft Xbox® or Sony PlayStation®, for example.

Figure 15:
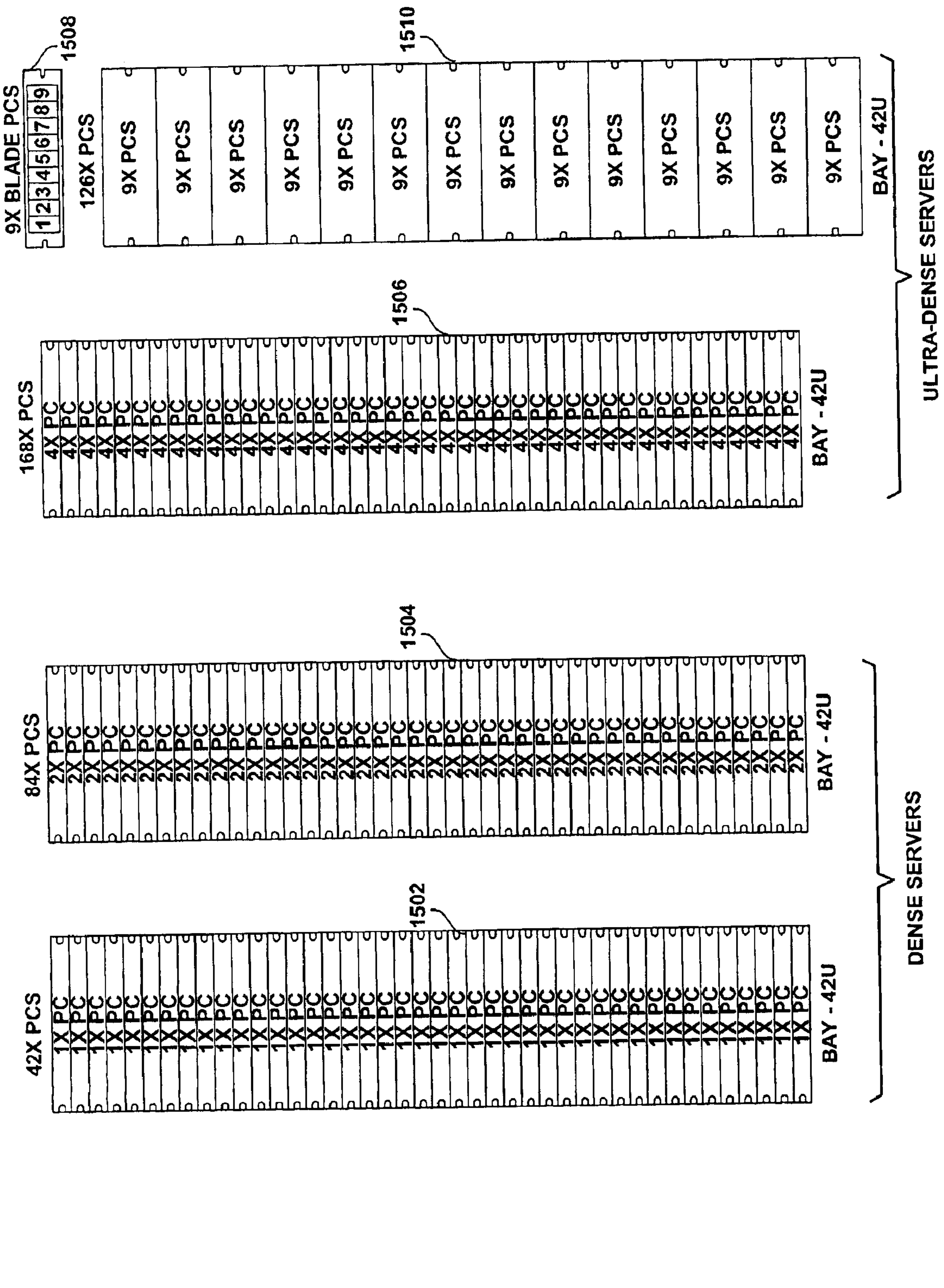
FIG. 15 is a diagram depicting a central server system, according to an embodiment of the present invention.

FIG. 15 illustrates the trend in server hardware to increase the processing power per square foot of floor space. As shown, computer cabinets are available in multiples of the standardized "U" size and 42U high cabinets are commonly used for computer servers. 1U-size "pizza box like" servers are very popular with Internet service providers, which form factor allows 42 computer servers to be stacked on top of one another in a 42U size cabinet, as shown at 1502. Already, computer suppliers are packing twice and even 4-times this density, whereby 2 and 4 computer servers are integrated in a 1U rack, thus offering 84 and 168 computer servers 112 per 42U cabinet, as shown at reference numerals 1504 and 1506, respectively.

An alternative to the 1U pizza size form factor servers is the "blade" size factor whereby a complete server 112 may be integrated on a narrow board or blade. One presently proposed configuration allows 9 (reference numeral 1508) or 10 blade servers to be logged into a 3U size rack as shown on the right side of FIG. 15. These racks may then be stacked, as shown at 1510. The complete server fits on a small board that may be very easily accessed for replacement or upgrade. Higher density dense servers are being developed that make use of very low power processing components such as fitted in laptops and hand held PCs, to help resolve the heat dissipation problem. It is to be noted that each of the servers discussed above may include a complete computer with CPU, memory, disk, network interface, and optionally full graphics. Large server farms that have on the order of 10,000 servers employ this type of dense server technology.

According to one embodiment of the present invention, each server shown in FIG. 15 corresponds to a central server 112 and may be associated with and connected to a remotely located gaming machine. Preferably, each server 112 shown in FIG. 15 is configured for multimedia graphics, generating 3D video and data streams encoded according to an MPEG standard, for example. In this manner, the central servers 112 may be constructed of an array of inexpensive servers, such as off the shelf PCs. Indeed, according to another embodiment of the present invention, the video stream shown to the player is generated (in MPEG4 format, for example) and streamed to the gaming machine over a broadband connection.

Figure 16:
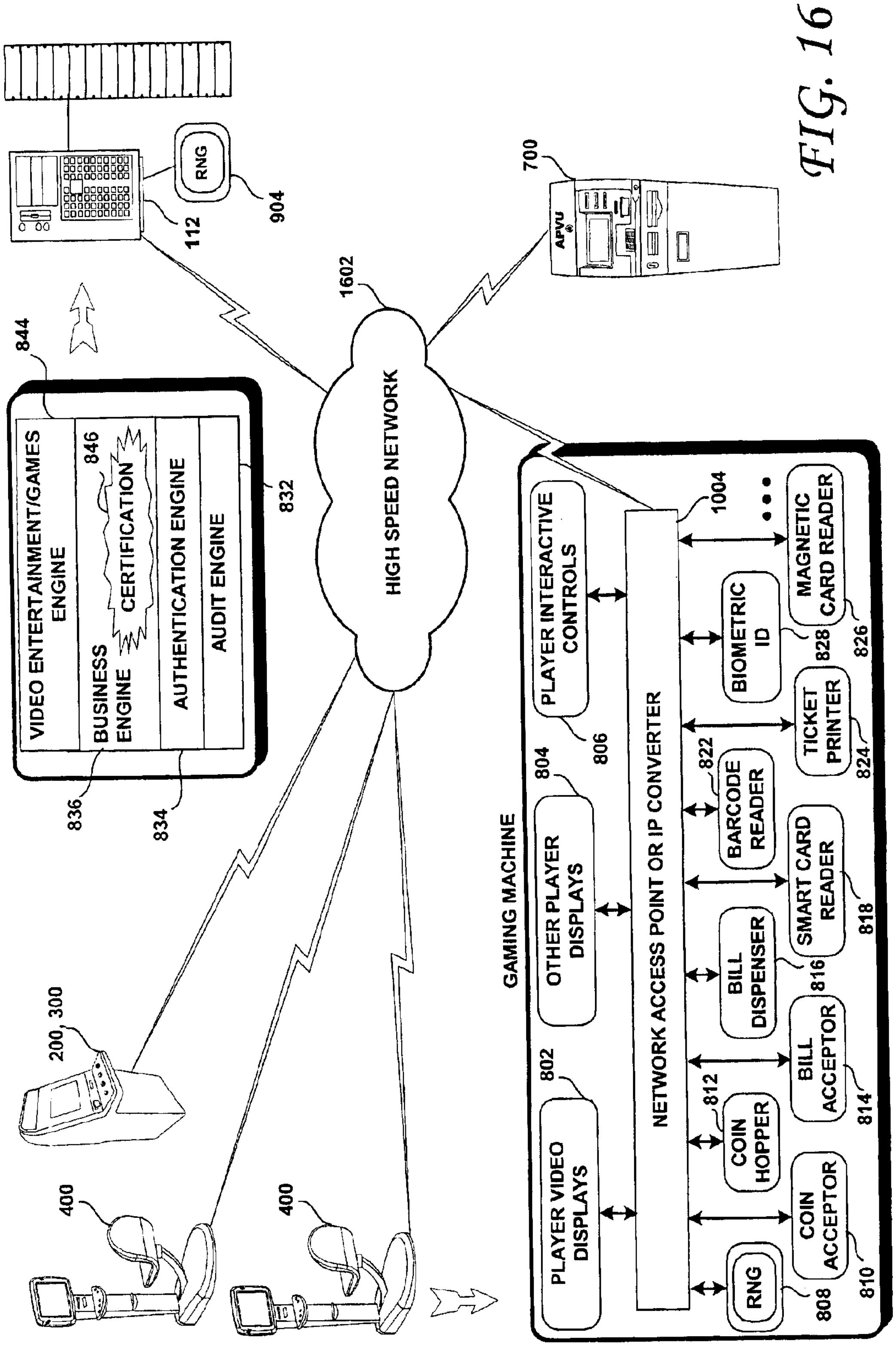
FIG. 16 is a diagram depicting processing of gaming machine functions by PCs within a central server system, in accordance with an embodiment of the present invention.

FIG. 16 illustrates another embodiment of the present invention in which the execution of all the high-level software modules may be carried out at the central server(s) 112, including the video entertainment/game engine module 844. For this, a high-speed network 1602 is required to bring the video signal to the gaming machine, which may then be fitted with a simple video receiver. Each remote gaming machine may be connected to and associated with an individual server 112 within the central server system or form of server 112. Other player displays and interactive control may also be controlled directly by the central server(s) 112 via network services.

Suitable means of transmitting such a video signal to the present gaming machine may include, for example, cable or wireless TV, HDTV or digital TV broadcast whereby each gaming machine is tuned to receive a separate predetermined frequency corresponding to the image to be displayed to the player, high quality video streaming such as MPEG2, MPEG4, or other emerging digital video standards via Fast Ethernet such as 100 Mbps, 1000 Mbps and upcoming higher bandwidth protocols, a fiber optic network, a wireless network such as IEEE 802.11b (11 Mbps), 802.11a (54 & 72 Mbps @ 5 GHz), 802.11 g (54 Mbps@ 2.4 GHz) and upcoming higher bandwidth protocols. It is to be noted that the means of video transmission and reception listed above, whether based on TV technology or media streaming technology, are already fairly economical and it is believed that the associated costs will continue to decrease rapidly.

Figure 17:
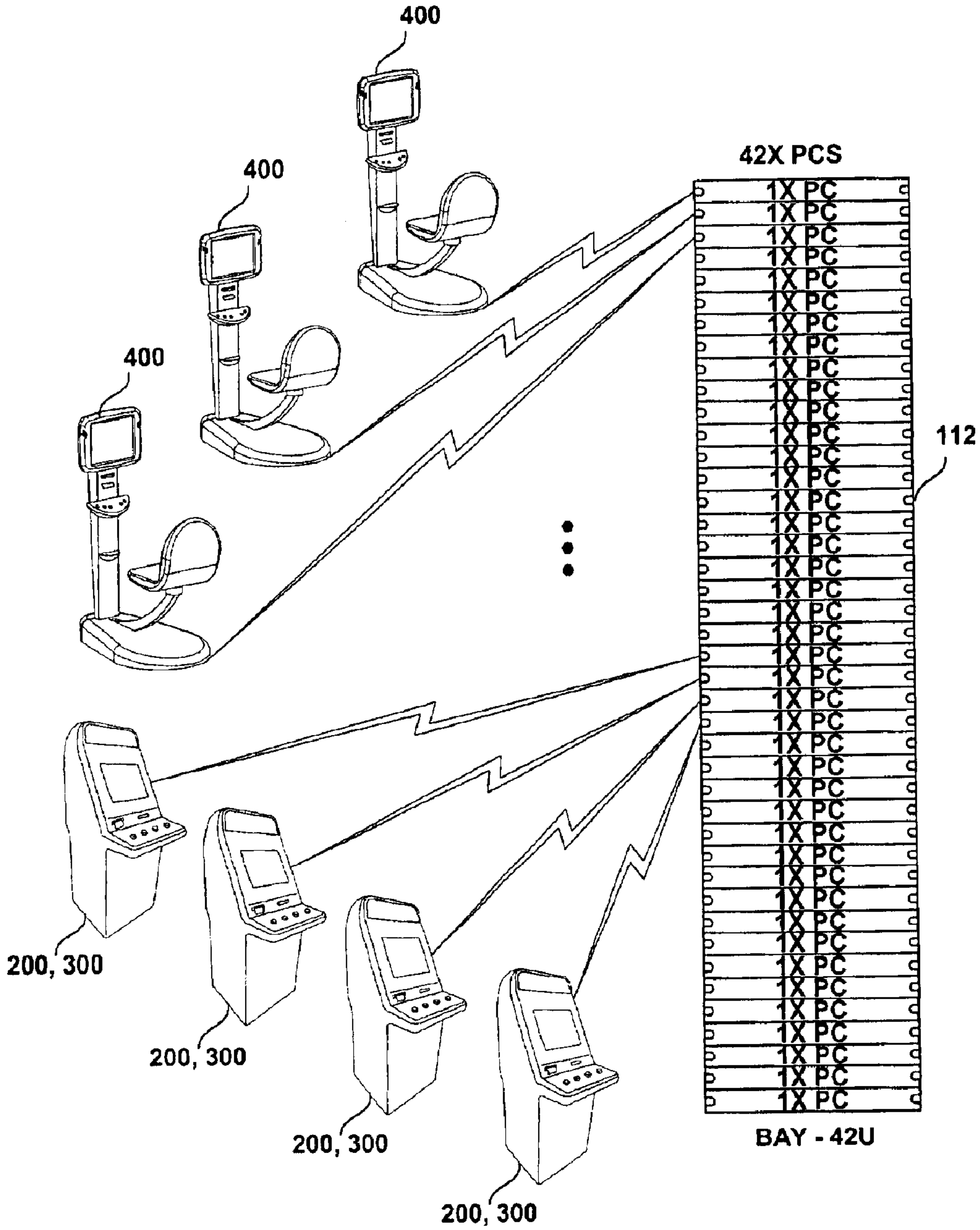
FIG. 17 is a diagram depicting each remote gaming machine connected to an individual PC or computer server located within a central server system 112, in accordance with an embodiment of the present invention.

FIG. 17 illustrates another embodiment of the present invention, in which a server (an individual PC, for example) located in a 42U Bay (for example) is associated with each gaming machine at the central server(s) 112. The server 112 associated with each gaming machine would then execute all or part of the software modules (audit engine 832, the authentication engine 834, the business engine 836 and the video entertainment/game engine 844) of the gaming machine. Interaction between the gaming machines and the central server(s) 112 is via network appropriate services as detailed above.

In particular, intensive video rendering to the player may be best if generated by an individual server at the central site and then the generated video signal may then be transmitted to the gaming machine. In this manner, there is considerable power to generate very advanced and attractive graphics for the player. Real-time translation to video streaming such as MPEG2 or MPEG4 may require hardware acceleration that may be carried out by a separate dedicated integrated circuit or alternatively may be directly integrated within the graphic processing unit of the server associated with the gaming machine.

Devices to receive high quality video information from the central server(s) 112, decode it and display it on a TV screen or a video display monitor are readily available. These devices use advanced electronic components developed for the latest generation Internet ready set top boxes and interactive TV systems. For example, such devices may be drawn from the devices and systems disclosed in commonly assigned and co-pending patent application Ser. No. 09/932,282 filed on Aug. 17, 2001 and entitled "Interactive Television Devices And Systems", the disclosure of which is incorporated herein in its entirety.

According to further embodiments of the present invention, each of the gaming machines may be configured to selectively offload computations to the farm of computer servers over the communication network. This may be done in a one-to-one manner whereby a computer server is entirely allocated to a given gaming machine, in a one-to-many manner whereby several computer servers are allocated to one gaming machine, or in a many-to-one manner whereby one computer server is allocated to several gaming machines.

Figure 18:
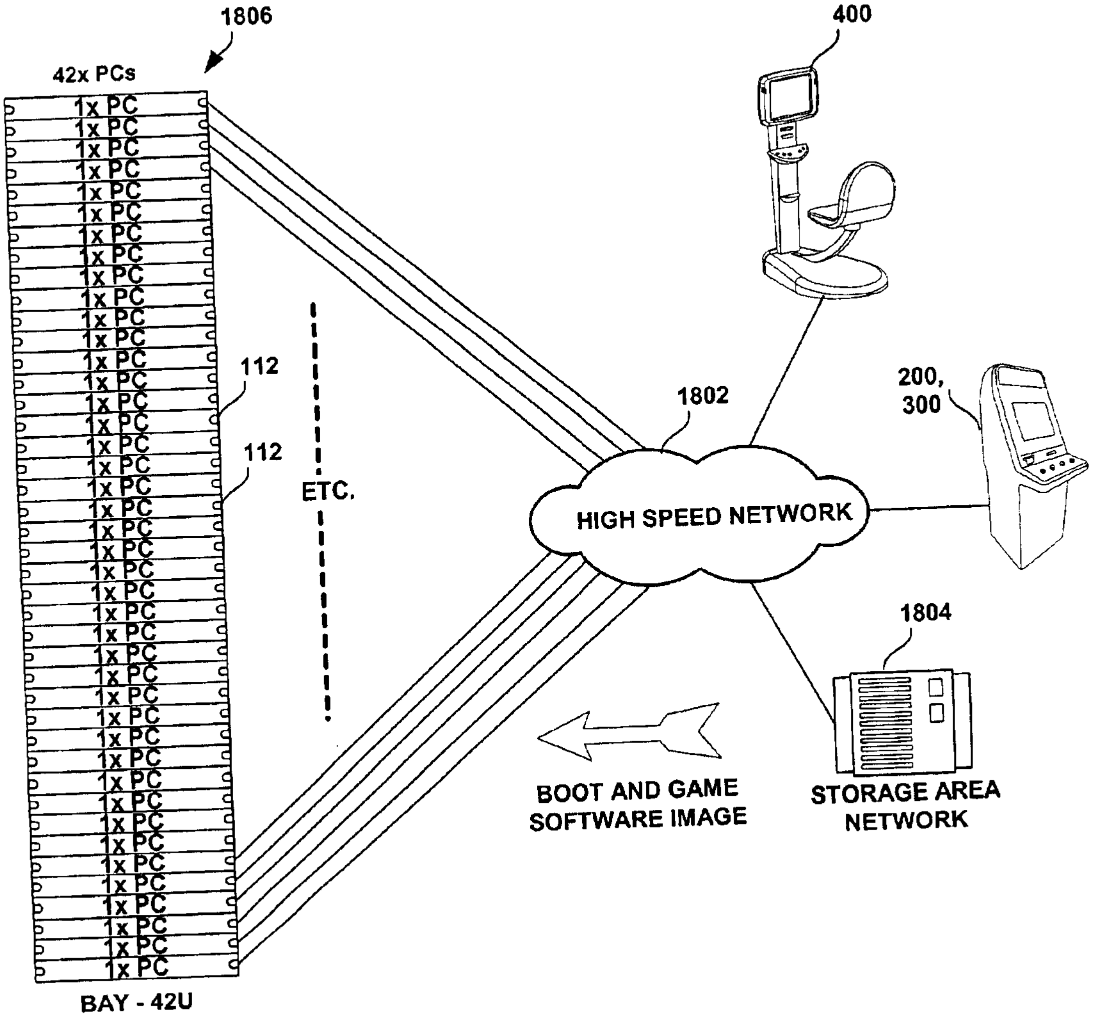
FIG. 18 is a diagram depicting a central server system that includes a server farm for performing operating system and applications boot to the individual PCs of a central server from a central storage facility, in accordance with an embodiment of the present invention.

FIG. 18 shows another embodiment of the present invention in which the operating system and/or applications of each server 112 (collectively referenced by numeral 1806) may be booted from a central data storage such as a Storage Area Network (SAN) device 1804 coupled to the network 1802. This approach is commonly used for large server farms, as it enables each server 112 to obtain the same software image from a central repository (SAN 1804). Consequently, software upgrades are immediate. The PXE (Preboot Execution Environment) standard may be advantageously adopted to enable booting of the operating system within each of the server computers 112 via the network 1802. In this manner, each server 112 boots and loads the same software image from a centralized network accessible storage 1804.

The video rendering and distribution approach described above whereby the intensive graphics operations are performed at the central server(s) 112 has considerable benefits for the gaming machines, notably:

a. Low cost computer hardware (no CPU intensive graphics operation, no expensive graphics accelerator);

b. Stability and reliability as the gaming machine computer platform (hardware and software) are simple and do not need to be upgraded;

c. Future proofing (prevents obsolescence), as no software or hardware upgrades are required to accommodate extremely resource intensive multimedia advances such as future generations of advanced graphics animation, voice recognition, face recognition, avatar creation, etc. Moreover, selection of a given microprocessor architecture, operating system platform and supplier do not impact the future capabilities of the gaming machine, and d. the video encoding, transmission, reception and decoding means may use low cost and mass-produced economical TV and streaming media components.

Moreover, this approach is ideally suited for offering wireless mobile gaming machines that players may take to the bar, the restaurant, the swimming pool, their hotel room, etc.

CONCLUSIONS

The invention offers a modular architecture for an on-line gaming system that may readily accommodate the wide variety of regulatory requirements encountered around the world. The strongest open security standards may be used. The very complex software code is located in the high-level software modules that may advantageously be developed using an advanced unified integrated development environment (such as, for example, Microsoft NET). The various elements may be arranged in a tightly coupled configuration, loosely coupled configuration or in a mixture of tightly and loosely coupled configuration without requiring the high-level software modules to be entirely redesigned, retested and re-certified. In most cases, the high-level software modules may be re-used without modification thus saving enormous cost and development, validation and testing time. A gaming system may be constructed using a wide variety of computer hardware and software platforms, and make use of the latest multimedia technologies to attract the younger generation of players used to flashy and networked games. IP-Ready specialized devices using Internet appliance technologies offer tremendous benefit as the gaming machines, entertainment machines and payment verification units become a simple shell; the devices may be fully managed by the central server(s) 112. A preferred embodiment of the invention is one in which the processing of all the high-level software modules, including graphics rendering, is carried out by the central server(s) 112, which relies on a server-class operating system and fault tolerant computing platform. Consequently, the present invention provides an architecture that overcomes the technical lag, security limitations and lack of stability of the prior art.

Rapidity changing technologies, such as advanced multimedia graphics and biometric recognition that require continual increase in processing power are, in the present invention, processed at the central server(s) 112. The present gaming machine, according to one embodiment thereof, only requires means of receiving and displaying high quality video images and means for sending locally captured biometric data (such as voice or video image of player) to the central server(s) 12. Wireless mobile gaming machine may be readily constructed. The central server(s) 112 (constructed with advanced server blades in one embodiment of the present invention) may be readily upgraded at any time by plugging in new replacement blades. Moreover, it is likely that entire server blades will soon fit on a single integrated circuit. One or more servers 112, therefore, may fit on a single integrated circuit. The present gaming machines do not require costly upgrades to take advantage of such multimedia advances. Consequently, the present invention provides an architecture that overcomes rapid obsolescence of technology. The devices, methods and systems disclosed herein provide a flexible architecture that enables international suppliers to readily accommodate the variety of specific regulatory requirements encountered around the world.

What is claimed is:

1. A gaming system including:

a plurality of gaming machines, each including:
  means for receiving and displaying video images;
  means for providing user interaction network services;

a central server, the central server including a separate user interaction and game engine associated with each of the plurality of gaming machines, the user interaction and game engine including:
  means for consuming the user interaction network services;
  processing means for applying game rules;
  computer graphics means for creating video images in response to directives from at least one of the processing means for applying game rules and the user interaction network services, and
  video casting means for transmitting the video images, and a communication network linking the plurality of gaming machines and the central server to enable the network services to be supplied and consumed, wherein each of the plurality of gaming machine displays video images produced by its associated user interaction and game engine in response to user interaction.

2. A gaming system according to claim 1, wherein the communication network uses wireless technology, the video casting means uses wireless technology and the gaming machine is portable and mobile.

3. A gaming system according to claim 1, wherein user interaction includes means for processing voice commands.

4. A gaming system according to claim 1, wherein the video casting means use analog or digital TV wireless or cable broadcast technology.

5. A gaming system according to claim 1, wherein the means for receiving and displaying video images includes a standard TV fitted with a video signal tuner, a plasma screen fitted with a video receiver, a HDTV fitted with a HDTV video tuner, a TV set top box and TV, a HDTV set top box and a HDTV or a video display driven by a hardware digital decoder.

6. A gaming system according to claim 1, wherein the central server further includes means for creating and casting sound signals for each gaming machine, and wherein each gaming machine further includes means for receiving and rendering sound signals.

7. A gaming system including:

a plurality of gaming machines, each including:

means for receiving and displaying video images;

means for providing user interaction network services;

a central server system including a farm of computer servers that are separate and distinct from the plurality of gaming machines, the farm including one computer server associated with each of the plurality of gaming machines, each computer server including:

means for consuming user interaction network services provided by the associated gaming machine;

processing means for applying game rules to games played on the associated gaming machine;

computer graphics means for creating video images in response to directives from the processing means for applying game rules and the user interaction network services;

video casting means for transmitting the video images to the associated gaming machine, and a communication network linking the plurality of gaming machines and the central server system to enable network services to be supplied and consumed, wherein each gaming machine displays video images produced by its associated computer server in response to user interaction.

8. A gaming system according to claim 7, wherein the communication network uses wireless technology, the video casting means uses wireless technology and the gaming machine is portable and mobile.

9. A gaming system according to claim 7, wherein user interaction means includes means for processing voice commands.

10. A gaming system according to claim 7, wherein the video casting means includes analog or digital TV wireless or cable broadcast technology.

11. A gaming system according to claim 7, wherein the video casting means use a wireless network communications standard.

12. A gaming system according to claim 7, wherein the means for receiving and displaying video images includes a standard TV fitted with a video signal tuner, a plasma screen fitted with a video receiver, a HDTV fitted with a HDTV video tuner, a TV set top box and TV, a HDTV set top box and a HDTV or a video display driven by a hardware digital decoder.

13. A gaming system according to claim 7, wherein each computer server in the farm of computer servers further includes means for creating and casting sound signals for each gaming machine, and wherein each gaming machine further includes means for receiving and rendering the sound signals.

14. A gaming system including:

a plurality of gaming machines, each including:

means for receiving, decoding and displaying video images;

means for providing user interaction network services;

a central server, the central server including a separate user interaction and game engine associated with each of the plurality of gaming machines, the user interaction and game engine including:

means for consuming user interaction network services;

computer means for processing game rules;

computer graphics means for creating video images in response to directives from the computer means for processing game rules and the user interaction network services;

video coding means for compressing the video image;

video casting means for transmitting the compressed video images, and a communication network linking a plurality of gaming machines and the central server to enable network services to be supplied and consumed, wherein each gaming machine displays video images produced by its associated user interaction and game engine in response to user interaction.

15. A gaming system according to claim 14, wherein the communication network uses wireless technology, the video casting means uses wireless technology and the gaming machine is portable and mobile.

16. A gaming system according to claim 14, wherein user interaction may include means for processing voice commands.

17. A gaming system according to claim 14, wherein the video coding means uses digital video encoding technology.

18. A gaming system according to claim 14, wherein the video casting means use network video streaming.

19. A gaming system according to claim 14, wherein the video casting means use an IP network communication standard.

20. A gaming system according to claim 14, wherein the video casting means use an IP wired network communication standard.

21. A gaming system according to claim 14, wherein and the central server further includes means for creating and casting sound signals for each gaming machine, and each gaming machine further includes means for receiving and rendering sound signals.

22. A gaming system including:

a plurality of gaming machines, each including:

means for digitally capturing user raw biometric data;

means for providing user raw biometric data network services;

a central server including, the central server including a separate user interaction and game engine associated with each of the plurality of gaming machines, the user interaction and game engine including:

means for consuming user raw biometric data network services;

computer means for processing the raw biometric data, means for providing processed biometric data network services, and a communication network linking the plurality of gaming machines and the central server to enable network services to be supplied and consumed, wherein each of the plurality of gaming machines obtains processed biometric data from its associated user interaction and game engine in response to capture of user raw biometric data.

23. A gaming system according to claim 22, wherein the communication network uses wireless technology and the gaming machine is portable and mobile.

24. A gaming system according to claim 22, wherein the raw biometric data includes unprocessed fingerprint or palm print data.

25. A gaming system according to claim 22, wherein the raw biometric data includes unprocessed voice data.

26. A gaming system according to claim 22, wherein the raw biometric data includes and unprocessed video image of a user's head or face.

27. A gaming system according to claim 22, wherein the processed biometric data constitutes a certified identity of the user.

28. A gaming system according to claim 22, wherein the processed biometric data includes a software command event resulting from a user voice command.

29. A gaming system according to claim 22, wherein the raw biometric data includes unprocessed video image of a user's head or face and the processed biometric data includes a user avatar.

30. A gaming system including:

a plurality of gaming machines, each including at least one specialized device comprising:

means for digitally capturing user raw biometric data;

means for providing user raw biometric data network services;

a central server, the central server including a separate user interaction and game engine associated with each of the plurality of gaming machines, the user interaction and same engine including:

means for consuming user raw biometric data network services;

computer means for processing the raw biometric data, means for providing processed biometric data network services, and a communication network linking the plurality of gaming machines, each specialized device and each user interaction and game engine to enable network services to be supplied and consumed, wherein each of the plurality of gaming machines obtains processed biometric data from its associated user interaction and game engine in response to capture of user raw biometric data.

31. A gaming system according to claim 30, wherein the communication network uses wireless technology and the gaming machine is portable and mobile.

32. A gaming system according to claim 30, wherein the raw biometric data includes unprocessed fingerprint or palm print data.

33. A gaming system according to claim 30, wherein the raw biometric data includes unprocessed voice data.

34. A gaming system according to claim 30, wherein the raw biometric data includes an unprocessed video image of a user's head or face.

35. A gaming system according to claim 30, wherein the processed biometric data constitutes a certified identity of the user.

36. A gaming system according to claim 30, wherein the processed biometric data includes a software command event resulting from a user voice command.

37. A gaming system according to 30, wherein the raw biometric data includes unprocessed video image of a user's head or face and the processed biometric data includes a user avatar.

38. A gaming system including:

a plurality of gaming machines, each including:

means for digitally capturing user raw biometric data;

means for providing user raw biometric data network services;

a central server system including a farm of computer servers that are separate and distinct from the plurality of gaming machines, the farm of computer servers including one computer server associated with each gaming machine, each of the computer servers including:

means for consuming user raw biometric data network services;

computer means for processing the raw biometric data;

means for providing processed biometric data network services, and a communication network linking each gaming machine with its associated computer server enabling network services to be supplied and consumed, wherein each gaming machine obtains processed biometric data from its associated computer server in response to capture of user raw biometric data.

39. A gaming system according to claim 38, wherein the communication network uses wireless technology and the gaming machine is portable and mobile.

40. A gaming system according to claim 38, wherein the raw biometric data includes unprocessed fingerprint or palm print data.

41. A gaming system according to claim 38, wherein the raw biometric data includes unprocessed voice data.

42. A gaming system according to claim 38, wherein the raw biometric data includes unprocessed video image data of a user's head or face.

43. A gaming system according to claim 38, wherein the processed biometric data is a certified identity of the user.

44. A gaming system according to claim 38, wherein the processed biometric data includes a software command event resulting from a user voice command.

45. A gaming system according to claim 38, wherein the raw biometric data includes unprocessed video image data of a user's head or face and the processed biometric data includes a user avatar.

* * * * *

UNITED STATES PATENT AND TRADEMARK OFFICE

CERTIFICATE OF CORRECTION

PATENT NO. : 6,945,870 B2
DATED : September 20, 2005
INVENTOR(S) : Jean-Marie Gatto, Thierry Brunet De Courssou and Pierre-Jean Beney It is certified that error appears in the above-identified patent and that said Letters Patent is hereby corrected as shown below:

Column 22,
Line 44, after "IP" insert -- wired --.
Line 47, delete "an IP wired" and insert -- a wireless --.

Column 23,
Line 17, replace "and" with -- an --.
Line 38, replace "same" with -- game --.

Signed and Sealed this

Eighth Day of November, 2005

JON W. DUDAS
*Director of the United States Patent and Trademark Office*